US008775622B2

(12) United States Patent
Wada

(10) Patent No.: US 8,775,622 B2
(45) Date of Patent: Jul. 8, 2014

(54) COMPUTER-BASED CLUSTER MANAGEMENT SYSTEM AND METHOD

(75) Inventor: Shinya Wada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1257 days.

(21) Appl. No.: 11/659,290

(22) PCT Filed: Aug. 1, 2005

(86) PCT No.: PCT/JP2005/014467
§ 371 (c)(1),
(2), (4) Date: Jul. 31, 2008

(87) PCT Pub. No.: WO2006/013992
PCT Pub. Date: Feb. 9, 2006

(65) Prior Publication Data
US 2008/0320138 A1 Dec. 25, 2008

(30) Foreign Application Priority Data
Aug. 2, 2004 (JP) .................................. 2004-225315

(51) Int. Cl.
*G06F 15/173* (2006.01)
(52) U.S. Cl.
USPC ............ 709/226; 709/223; 709/224; 709/225
(58) Field of Classification Search
USPC .......................... 709/206, 226, 223, 224, 225
See application file for complete search history.

(56) References Cited

U.S. PATENT DOCUMENTS

| 5,666,484 | A | * | 9/1997 | Orimo et al. ..................... 714/18 |
| 5,822,531 | A | * | 10/1998 | Gorczyca et al. ............. 709/221 |
| 6,748,429 | B1 | * | 6/2004 | Talluri et al. .................. 709/221 |
| 7,139,925 | B2 | * | 11/2006 | Dinker et al. ..................... 714/4 |

(Continued)

FOREIGN PATENT DOCUMENTS

| EP | 0 750 256 | 12/1996 |
| JP | 2204-341962 A | 12/2004 |
| JP | 2005-251160 A | 9/2005 |
| WO | 2004001598 | 12/2003 |

OTHER PUBLICATIONS

International Search Report and Written Opinion dated Nov. 29, 2005 from the corresponding International Application PCT/JP2005/014467.

(Continued)

*Primary Examiner* — Harunur Rashid
(74) *Attorney, Agent, or Firm* — Katten Muchin Rosenman LLP

(57) ABSTRACT

There is provided a network system capable of effectively executing a process of submitted jobs, the size, the type, and the number of which are expected to change every moment. A management computer manages connection enabled/disabled information indicating whether a computer under its control can be connected to another computer and easiness information indicating the easiness of the connection with the another computer. The management computer searches for a computer whose latest connection enabled/disabled information managed by a local and another management computer indicates the connection enabled state and according to the easiness information on the computer specified, forms a cluster including the specified computer. The management computer updates the connection enabled/disabled information on the computer clustered, to the connection disabled state and upon completion of execution of the job, returns the connection enabled/disabled information on all the computers belonging to the cluster to the state before formation of the cluster.

20 Claims, 16 Drawing Sheets

(56) References Cited

U.S. PATENT DOCUMENTS

2002/0010840 A1* 1/2002 Barroso et al. ............... 711/141
2002/0049859 A1* 4/2002 Bruckert et al. ............. 709/246
2002/0103893 A1* 8/2002 Frelechoux et al. ......... 709/223
2005/0257220 A1* 11/2005 McKee ........................ 718/100

OTHER PUBLICATIONS

Jaesun Han and Daeyeon Park, "A lightweight personal grid using a supernode network", Proceeding of Third International Conference on Peer-to-Peer Computing (Peer-to-Peer Computing (P2P'03), Sept. 3, 2003, pp. 168 to 175.

Elth Ogston et al., "A method for decentralized clustering in large multi-agent systems", Proceedings of the second international joint conference on Autonomous agents and multiagent systems, July 18, 2003, pp. 789-796.

Wen Dou et al., "A P2P approach for global computing", Proceedings of International Parallel and Distributed Processing Symposium (IPDPS'03), Apr. 26, 2003, CD-ROM.

Alexei Vazquez, "Growing network with local rules: Preferential attachment, clustering hierarchy, and degree correlations", 2003, Physical Review, vol. 67, No. 5, 056104.1-056104.15.

Supplementary European Search Report dated Nov. 17, 2008, from the corresponding European Application.

* cited by examiner (a)

2161

| | | |
|---|---|---|
| 2361 | CLUSTER ID | ******** |
| 2362 | CLUSTER SIZE | ******** |
| 2363 | COMPUTER LIST | |
| 2364 | CLUSTER STATUS | idol |
| 2365 | MAXIMUM NUMBER OF COMPUTERS | 200 |
| 2366 | MINIMUM NUMBER OF COMPUTERS | 3 |
| 2367 | TOTAL NUMBER OF COMPUTERS | 48 |
| 2368 | CONNECTION RATIO | 0.48 |

(b)

2162

| | | |
|---|---|---|
| 2461 | CLUSTER ID | ******** |
| 2462 | COMPUTER id | ******** |

| | |
|---|---|
| 2361 CLUSTER ID | ******** |
| 2362 CLUSTER SIZE | ******** |
| 2363 COMPUTER LIST | |
| 2369 CLUSTER LIST | |
| 2364 CLUSTER STATUS | idol |
| 2365 MAXIMUM NUMBER OF COMPUTERS | 200 |
| 2366 MINIMUM NUMBER OF COMPUTERS | 3 |

COMPUTER-BASED CLUSTER MANAGEMENT SYSTEM AND METHOD

This application is a National Phase Application of International Application No. PCT/JP2005/014467, filed Aug. 1, 2005, which claims the benefit under 35 U.S.C. 119 (a-e) of Japanese Application No. 2004-225315 filed Aug. 2, 2004, which is herein incorporated by reference.

TECHNICAL FIELD

The present invention relates to a technology of efficient distributed computing performed by multiple computers connected to a computer network under a broadband environment.

More specifically, the present invention relates to a network system in which distributed computing is possible, configuration elements thereof, and a cluster management method for use in a network.

BACKGROUND ART

Nowadays, distributed processing is generally performed in which multiple computers connected to a network cooperate to process one job in a distributed manner. The distributed processing of a job conventionally necessitates the existence of a server that grasps the processing capabilities of all computers connectable to a network in advance for determination of allocation of the job to the computers.

The server specifies the magnitude of the load of the job and the excess processing capability (computing resource) of each computer connected to the network at the time of start of the distributed processing, successively allocates computers having excess processing capabilities corresponding to the load, and receives execution results of the job from the allocated computers.

With the conventional distributed processing method that requires a server, it is extremely difficult to swiftly grasp the excess processing capabilities of computers, which are connected to or disconnected from a network at an arbitrary point in time, at the server. Also, the server needs to receive execution results of a job from the computers, which have been requested for distributed processing of the job, and transfer the received results to a requester of the job, which increases overhead of the server. Therefore, there has frequently occurred such a problem that a time necessary for execution of a job and a time necessary for data transmission through a network substantially increases.

A principle object of the present invention is to provide a mechanism for distributed processing with which it becomes possible to solve the conventional problem described above.

DISCLOSURE OF THE INVENTION

The present invention solves the problem described above by providing a network system, configuration elements thereof, and a cluster management method that can efficiently execute distribution of information processing of jobs to be executed, the size, type, and number of which are expected to change every moment, with multiple computers.

Each "computer" in this specification refers to an apparatus including a processor that operates by executing a computer program but a device not in the form of an apparatus, a processor board, a processor chip, and a processor itself are also included in the concept of "computer". For instance, each processor in a multiprocessor system can also be considered as the "computer".

The present invention provides a network system having a first configuration, which can be freely joined and left by a plurality of computers each of which is capable of being clustered with another computer.

The network system includes: a first table for storing clustering enabled/disabled information indicating whether a state of each computer is a clustering enabled state; and a second table for storing addition easiness information indicating a degree of easiness in adding another computer to a cluster which has already been formed by one or a plurality of computers, One of the computers includes cluster forming means for forming a cluster including the computer itself and another computer indicated as being under the clustering enabled state by the clustering enabled/disabled information on the first table, updating the clustering enabled/disabled information on every computer included in the formed cluster to information indicating a clustering disabled state, and storing the addition easiness information on the formed cluster on the second table. Further, the computer that formed the cluster includes cluster growing means for, when a candidate computer that is a candidate for addition to the cluster exists, determining whether the candidate computer is to be added to the cluster according to the addition easiness information recorded on the second table.

In the network system having such a configuration, one of the computers autonomously forms a cluster based on the clustering enabled/disabled information on each computer recorded on the first table and records the addition easiness information on the cluster on the second table. The number of computers included in the cluster may be a default number determined at a timing of the formation of the cluster or may be a number flexibly determined in accordance with the size of a job actually submitted, the size of a job expected to be submitted in the near future, or the like. In either case, a cluster is formed through selection of computers indicated by the clustering enabled/disabled information as being under the clustering enabled state.

After formation of a cluster, when a candidate computer that is a candidate for addition exists, a computer that formed the cluster determines whether the candidate computer is to be added to the cluster according to the addition easiness information recorded on the second table.

The addition easiness information is used by a computer that formed a cluster to autonomously determine whether addition of a candidate computer is appropriate and various types of information are usable. A condition that only several computers applied for the addition at the very beginning are allowed to be added, a condition that only computers, whose identification information corresponds to numbers generated from a random number, are allowed to be added, or the like is also adoptable as the addition easiness information. However, from the viewpoint of simplification of the addition determining processing, a configuration is preferable in which a criterion, such as the easiness of the addition, is quantified using a numeric value and is set comparable in magnitude with this numeric value and as the numeric value increase, the easiness of the addition of the candidate computer to the cluster increases; Examples of the numeric value in this case are a numeric value with which the addition is permitted by randomly responding to only one of five addition enabled/disabled inquiries made irregularly (in this case, the numeric value becomes $1/5$, i.e., 20%), a numeric value with which the addition of the candidate computer is permitted only for addition enabled/disabled inquiries received in time periods whose total length is 10% of a system operation time per day (in this case, the numeric value becomes "24 (hours)×60 (minutes)×60 (seconds)×0.1×α(probability value)"), and the like.

It should be noted that the numeric value may be held to a constant value regardless of addition of a candidate computer or may be set variable after storing on the second table. The configuration, in which the numeric value is set variable, produces an advantage that by varying the numeric value with addition of a candidate computer to a cluster as a trigger, to a cluster to which candidate computers gather easily, more candidate computers gather easily, which facilitates formation of a cluster having a size corresponding to an actual demand.

Through successive addition of candidate computers to a cluster in the manner described above, clusters having various sizes are formed on multiple computers of a network system and grow. Therefore, distributed computing is realized which is capable of efficiently executing information processing of jobs to be executed, the size, the type, and the number of which are expected to change every moment, and the conventional problem is solved.

In an embodiment mode of the network system having the first configuration, the computer that formed the cluster further includes cluster erasing means for, upon completion of execution of a job by the cluster, erasing the cluster and returning the addition easiness information recorded on the second table and the clustering enabled/disabled information on every computer, which belonged to the erased cluster, recorded on the first table to states before the formation of the cluster.

A cluster grows according to the addition easiness information described above until a job has been executed but is broken up or erased upon completion of the execution of the job, so it becomes possible to achieve effective use of computers as compared with a case where the cluster is prepared in a fixed manner.

The present invention provides a network system having a second configuration, which can be freely joined and left by a plurality of management computers each of which controls one or a plurality of computers, each capable of being clustered with another computer, as a computer or computers which belong to the management computer.

The "controls one or a plurality of computers as a computer or computers which belong to the management computer" refers to control of operations of the multiple computers connected to the management computer and supervision of operation states of the computers.

The network system includes: a first table for storing clustering enabled/disabled information indicating whether a state of each computer is a clustering enabled state; and a second table for storing addition easiness information indicating a degree of easiness in adding another computer to a cluster which has already been formed by one or a plurality of computers.

Further, at least one management computer includes cluster forming means for forming a cluster including a computer under its control and a computer controlled by another management computer indicated as being under the clustering enabled state by the clustering enabled/disabled information on the first table, and updating the clustering enabled/disabled information on every computer included in the formed cluster to information indicating a clustering disabled state. Further, the management computer that formed the cluster includes cluster growing means for, when a candidate computer that is a candidate for addition exists, determining whether the candidate computer is to be added to the cluster according to the addition easiness information recorded on the second table.

In the network system having such a configuration, a management computer autonomously forms a cluster based on the clustering enabled/disabled information on computers recorded on the first table and records the addition easiness information on the cluster on the second table. After the formation of the cluster, when a candidate computer that is a candidate for addition exists, the management computer that formed the cluster determines whether the candidate computer is to be added to the cluster according to the addition easiness information recorded on the second table. The clustering enabled/disabled information, handling of the addition easiness information, the clustering, and a criterion at the time of the cluster growth are the same as those in the network system having the first configuration.

In an embodiment mode of the network system having the second configuration, the management computer further includes cluster erasing means for erasing the formed cluster upon completion of execution of a job by the cluster and returning recorded information on the second table and recorded information on every computer that belonged to the erased cluster on the first table to states before the formation of the cluster.

A cluster grows according to the addition easiness information described above until a job has been executed but is erased upon completion of the execution of the job, so it becomes possible to achieve effective use of computers as compared with a case where the cluster is prepared in a fixed manner.

In the network system with the second configuration, the second table may exist at an arbitrary location but in ordinary cases, a management computer that generated the second table holds the table. In this case, the management computer holds multiple second tables, the maximum number of which is the number of computers under its control.

Each second table includes at least one of a master table and a slave table, the master table being, when a management computer holding the second table forms a first cluster including a first computer under its control, generated for the first computer, the slave table being, when the management computer holding the second table supervises and controls an operation of a second computer under its control added to a second cluster formed by another management computer, generated for the second computer. The addition easiness information is recorded on the master table. The management computer holding the master table acts as a master management computer for initiatively performing information processing concerning the formation of the first cluster, changing of a number of computers in the first cluster, and erasing of the first cluster, while the management computer holding the slave table acts as a slave management computer with respect to the second cluster.

From a viewpoint of facilitating the clustering, the master management computer includes search means for searching for a candidate computer for addition to the first cluster by inquiring of a management computer whether a computer under a clustering enabled state exists. Further, one of the management computers is configured to determine, according to the addition easiness information on the first cluster formed by the master management computer, whether a candidate computer under its control is to be added to the first cluster.

A network system having a third configuration, which can be freely joined and left by a plurality of computers each of which is capable of being clustered with another computer, includes: a table on which, for each cluster that has already been formed by one or a plurality of computers, identification information of another cluster associated with a computer belonging to the cluster has been listed up. In the network system, one of the computers that formed a cluster includes cluster growing means for, when a candidate computer that is a candidate for addition exists, determining whether the candidate computer is to be added to another cluster associated with the formed cluster according to the identification information listed up on the table. The phrase "associated with" refers to a situation where mutual communication is possible and cooperative processing or the like is possible, for instance. In the network system having such a configuration, clustering that follows power distribution becomes possible even when the addition easiness information is not used.

Also, the present invention solves the problem described above by providing a management computer for configuring the network system having the second configuration described above, for instance.

Such a management computer, which controls one or a plurality of computers, each capable of being clustered with another computer, as a computer or computers which belong to the management computer includes: network connecting means for establishing connection to a computer network that the management computer is capable of freely joining and leaving together with another management computer having the same type of function; table managing means for enabling access to a first table for storing clustering enabled/disabled information indicating whether a state of each computer is a clustering enabled state and a second table for storing addition easiness information indicating a degree of easiness in adding another computer to a cluster which has already been formed by one or a plurality of computers; cluster forming means for forming a cluster including one of the computers under its control and one of the computers controlled by another management computer indicated as being under the clustering enabled state by the clustering enabled/disabled information on the first table, updating the clustering enabled/disabled information on every computer included in the formed cluster to information indicating a clustering disabled state, and storing the addition easiness information on the cluster on the second table; and cluster growing means for, when a candidate computer that is a candidate for addition exists, determining whether the candidate computer is to be added to the cluster according to the addition easiness information recorded on the second table. The management computer may further include: cluster erasing means for, upon completion of execution of a job by the formed cluster, erasing the cluster and returning the addition easiness information recorded on the second table and the clustering enabled/disabled information on every computer, which belonged to the erased cluster, recorded on the first table to states before the formation of the cluster.

Further, the present invention solves the problem described above by providing a cluster management method executed by the multiple computers included in the network system having the first configuration or the third configuration described above, for instance.

A first cluster management method for use included in a network system which can be freely joined and left by a plurality of computers each of which is capable of being clustered with another computer, includes the steps of: storing, by each computer, on a first table, clustering enabled/disabled information indicating whether its state is a clustering enabled state; forming, by one of the computers, a cluster including the computer and another computer indicated as being under the clustering enabled state by the clustering enabled/disabled information on the first table; updating, by the computer, the clustering enabled/disabled information on every computer included in the formed cluster to information indicating a clustering disabled state; storing, by the computer, addition easiness information indicating a degree of easiness in adding another computer to the cluster on a second table; and determining, when a candidate computer that is a candidate for addition exists, whether the candidate computer is to be added to the cluster according to the addition easiness information recorded on the second table.

The cluster management method may further include the steps of erasing, by the computer that formed the cluster, the cluster upon completion of execution of a job by the formed cluster and returning, by the computer, the recorded information on the second table and the recorded information on every computer that belonged to the erased cluster on the first table to states before the formation of the cluster.

A second cluster management method for use in a network system which can be freely joined and left by a plurality of computers each of which is capable of being clustered with another computer, includes the steps of: listing up, by a computer that formed a cluster alone or together with another computer, on a predetermined table, identification information of another cluster associated with a computer belonging to the cluster; and determining, by the computer that formed the cluster, when a candidate computer that is a candidate for addition exists, whether the candidate computer is to be added to another cluster associated with the cluster according to the identification information recorded on the table.

Still further, the present invention solves the problem described above by providing a computer program for giving a predetermined function to a computer.

A first computer program is read and executed by a computer included in a network system which can be freely joined and left by a plurality of computers each of which is capable of being clustered with another computer. The first computer program causes the computer to function as: table managing means for enabling access to a first table for storing clustering enabled/disabled information indicating whether a state of each computer is a clustering enabled state and a second table for storing addition easiness information indicating a degree of easiness in adding another computer to a cluster which has already been formed by one or a plurality of computers; cluster forming means for forming a cluster including the computer itself and another computer indicated as being under the clustering enabled state by the clustering enabled/disabled information on the first table, updating the clustering enabled/disabled information on every computer included in the formed cluster on the first table to information indicating a clustering disabled state, and storing the addition easiness information on the cluster on the second table; and cluster growing means for, when a candidate computer that is a candidate for addition exists, determining whether the candidate computer is to be added to the cluster according to the addition easiness information recorded on the second table.

A second computer is program read and executed by a management computer that controls one or a plurality of computers, each capable of being clustered with another computer, as a computer or computers which belong to the management computer. The second computer program causes the management computer to function as: network connecting means for establishing connection to a computer network that the management computer is capable of freely joining and leaving together with another management computer having the same type of function; table managing means for enabling access to a first table for storing clustering enabled/disabled information indicating whether a state of each computer is a clustering enabled state and a second table for storing addition easiness information indicating a degree of easiness in adding another computer to a cluster which has already been formed by one or a plurality of computers; cluster forming means for forming a cluster including the computer under its control and the computer controlled by another management computer indicated as being under the clustering enabled state by the clustering enabled/disabled information on the first table, updating the clustering enabled/disabled information on every computer included in the formed cluster to information indicating a clustering disabled state, and recording the addition easiness information on the cluster on the second table; and cluster growing means for, when a candidate computer that is a candidate for addition exists, determining whether the candidate computer is to be added to the cluster according to the addition easiness information recorded on the second table.

A third computer program is read and executed by a computer included in a network system which can be freely joined and left by a plurality of computers each of which is capable of being clustered with another computer. The third computer program causes the computer to function as: cluster managing means for, when a cluster has already been formed by one or a plurality of computers, listing up identification information of another cluster associated with a computer belonging to the cluster on a predetermined table; and cluster growing means for, when a candidate computer that is a candidate for addition exists, determining whether the candidate computer is to be added to another cluster associated with the formed cluster according to the identification information listed up on the table.

Those computer programs are recorded on transportable recording media and are distributed in the market or are downloaded from a program server or the like through a computer network accessible from the computers or the management computers.

According to the present invention, clusters having various sizes are each formed by at least one of multiple computers in a network system and grow according to recorded information on a predetermined table, so it becomes possible to obtain a cluster having an arbitrary size with ease. As a result, such a unique effect is obtained that distributed computing is realized in which it is possible to efficiently execute even uncertain information processing of jobs to be executed, at least one of the size, the type, and the number of which is expected to change every moment.

BRIEF DESCRIPTION OF THE DRAWINGS

FIG. 6(*a*) shows an example of the contents of a master table and FIG. 6(*b*) shows an example of the contents of a slave table.

FIG. 14 shows an example of the contents of a master table used in a duplication mode.

BEST MODE FOR CARRYING OUT THE INVENTION (Architecture of Network System)

First, an architecture of a network system to which the present invention is applied will be described.

Figure 1:
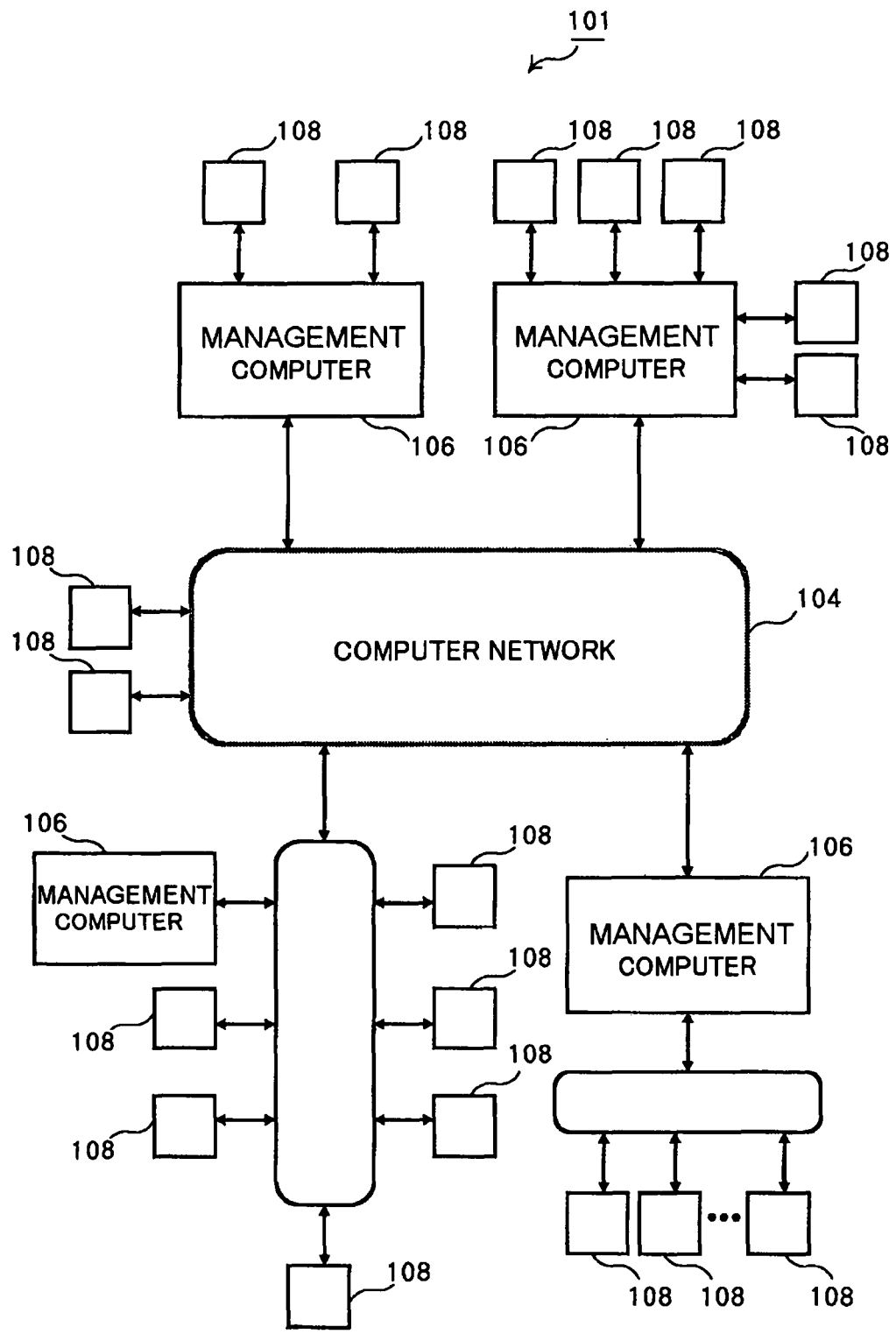
FIG. 1 is a general view of a network system to which the present invention is applied.

FIG. 1 is a general view of a network system 101 to which the present invention is applied. The network system 101 includes a computer network 104. Examples of the computer network 104 include a local area network (LAN), a global network such as the Internet, and other computer networks.

To the computer network 104, it is possible for each management computer 106, which controls one or multiple computers as a computer or computers which belong to the management computer 106, to connect at an arbitrary timing. The management computer 106 is capable of performing bidirectional communication with other management computers 106 and computers 108 controlled by the other management computers 106. Each computer 108 can be placed under the control of a management computer 106 as a computer which belongs to the management computer anytime. In other words, these computers 106 and 108 are each capable of freely joining and withdrawing from the network system 101 at any time.

The term, "computer", used in this embodiment refers to an apparatus including a processor that is operated by executing a computer program. However, a device, a processor board, and a collection which do not have the form of an apparatus are also included in the concept of "computer". Also, the situation where "the management computer 106 controls one or multiple computers 108 as a computer or computers which belong to the management computer" refers to a situation where the management computer 106 controls an operation of each computer 108 connected to itself and supervises an operation state of the computer.

Examples of the management computer 106 include a computer having a server function, a game console with a communication function, a computing device, and a processor board.

Examples of the computer 108 controlled by the management computer 106 include a personal computer, a game console with a communication function, other wired or wireless computers, a computing device, and a processor board.

There are various forms of connection of the computers 108 to the management computers 106. For instance, the connection forms include a star connection form in which the multiple computers 108 are directly connected to the management computers 106 while setting the management computers 106 connected to the computer network 104 as centers as shown in FIG. 1, an in-house network form in which the multiple computers 108 are connected through an in-house network to which the management computers 106 are connected, and a wide-area network form in which the multiple computers 108 are connected to the management computers 106 through the computer network 104.

The in-house network form also has various types of the in-house networks such as a network in which connection is directly made to the computer network 104 and a network in which connection is made to the computer network 104 through the management computers 106.

Figure 2:
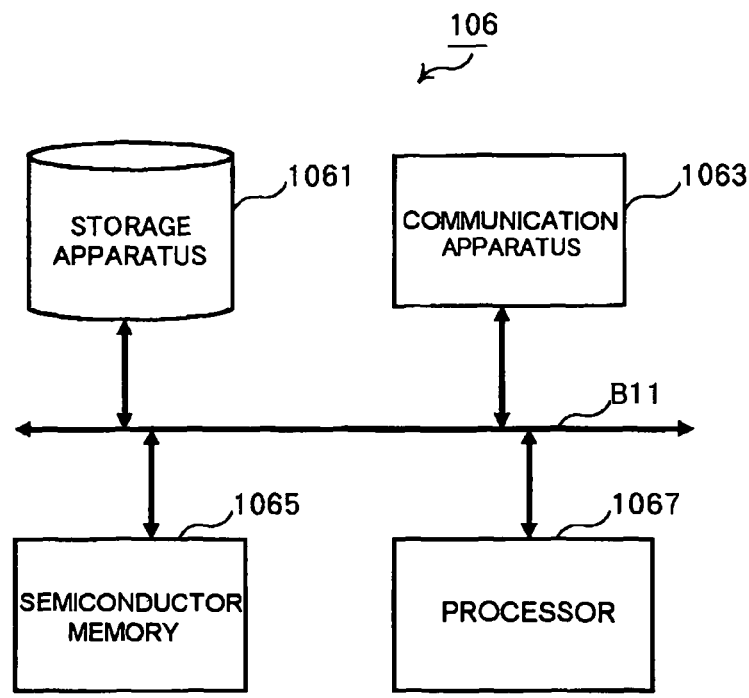
FIG. 2 shows the outline of an architecture of a management computer according to an embodiment of the present invention.
Figure 4:
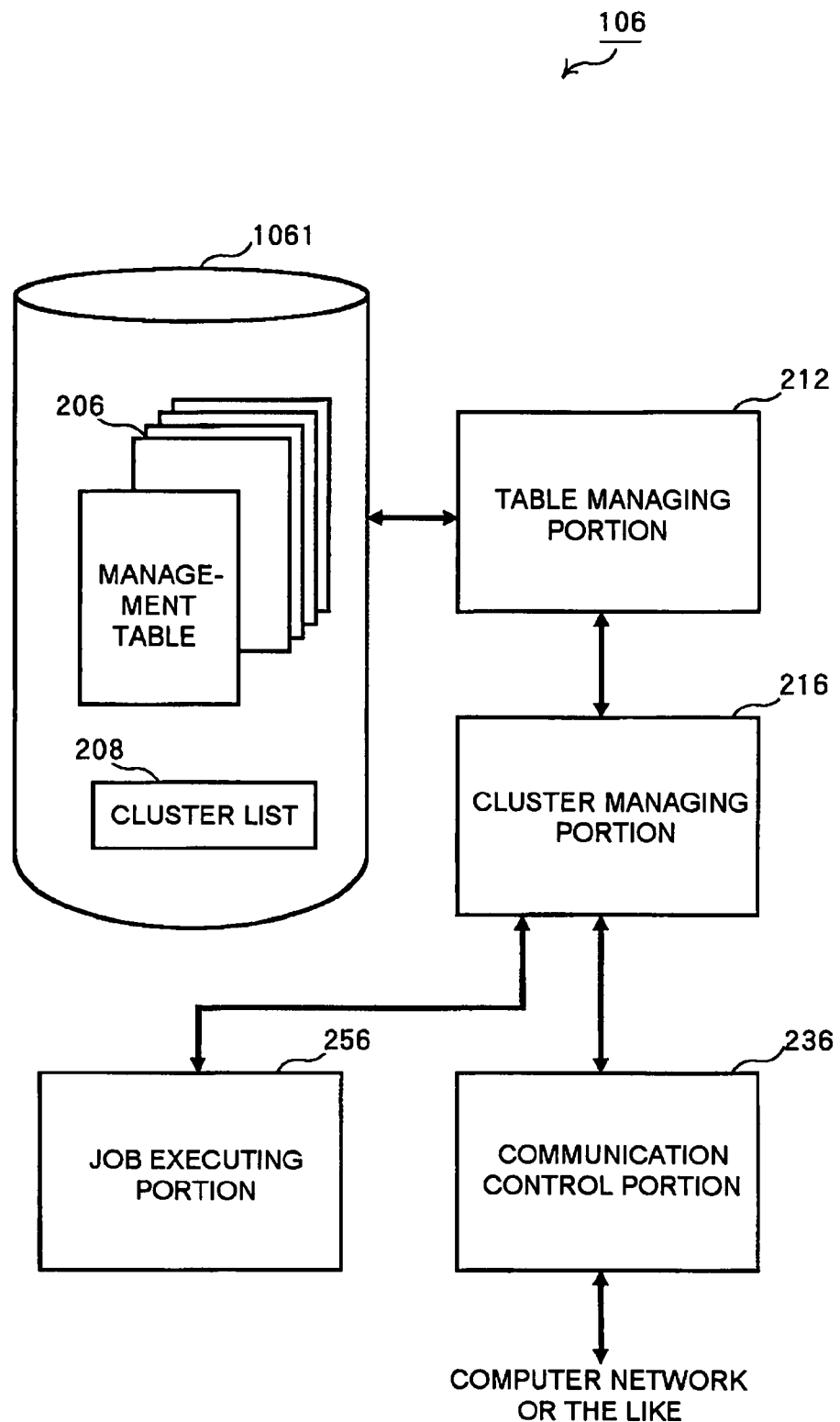
FIG. 4 is a functional configuration diagram of the management computer according to the embodiment.

As shown in FIG. 2, each management computer 106 includes a storage apparatus 1061 such as a hard disk, a communication apparatus 1063, a semiconductor memory 1065, and a processor 1067 that are mutually connected through a bus B11. In the management computer 106 having those hardware resources, the processor 1067 reads and executes a computer program loaded into the semiconductor memory 1065 through a recording medium such as a CD-ROM, thereby storing multiple management tables 206 to be described later in the storage apparatus 1061 and configuring functions of a table managing portion 212, a cluster managing portion 216, a communication control portion 236, and a job executing portion 256 in a computer body as shown in FIG. 4.

The table managing portion 212 accesses the management tables 206 and updates the recorded contents of the management tables 206. The cluster managing portion 216 performs information processing related to formation/growth/erasing of a cluster to which computers 108 under its control and computers 108 controlled by other management computers 106 belong. In other words, the cluster managing portion 216 functions as cluster forming means, cluster growing means, and cluster erasing means in accordance with a state change of the cluster.

The communication control portion 236 enables communication with each computer 108 under its control and another management computer 106 through the communication apparatus 1063. The job executing portion 256 submits a job to a cluster including one or more computers 108 controlled by the management computer 106 and requests execution of the job. The job executing portion 256 may be provided with a function of computing the size, processing time, and the like of the job in order to easily identify the optimum size of the cluster, in other words, the optimum number of computers.

Each computer 108 includes a storage apparatus, a communication apparatus, a semiconductor memory, and a processor that are the same as those of the management computer 106. In this embodiment, a status table to be described later is stored in the storage apparatus. Also, the processor reads and executes a computer program loaded into the semiconductor memory through a recording medium such as a CD-ROM, thereby configuring various functions concerning cluster management and job execution in a computer body. It is preferred that the instruction set architecture (ISA) of each computer 108 be completely the same or regarded as the same, and required processing be executed in accordance with the same instruction set.

Any number of computers 108 are controlled by each management computer 106. To each management computer 106, the number of computers 108 to be allocated depends on a processing capability necessary for execution of a job given by each application.

When the ISAs of multiple computers 108 controlled by the management computer 106 are the same or regarded as the same, it is possible to dramatically improve the adaptability in the management computer 106 or the network system 101.

Each management computer 106 forms a cluster including one or more of the computers 108 under its control and the computers 108 controlled by the other management computers 106, thereby enabling job execution in units of clusters. Between the computers 108 under its control and the computers 108 controlled by the other management computers 106, no performance difference, constraint, and the like exist in terms of formation of at least one cluster. Handling of the computers in this manner makes it less important which computers 108 execute a job and which management computers 106 control the computers 108. It is sufficient that a management computer 106 that has requested the job, a computer 108 controlled by the management computer 106, or any computer 108 that executes a following job is merely designated as a computer to receive a result of the execution of the job. Therefore, distributed execution of a job among the computers 108 controlled by multiple management computers 106 connected to the computer network 104 becomes easy.

Figure 3:
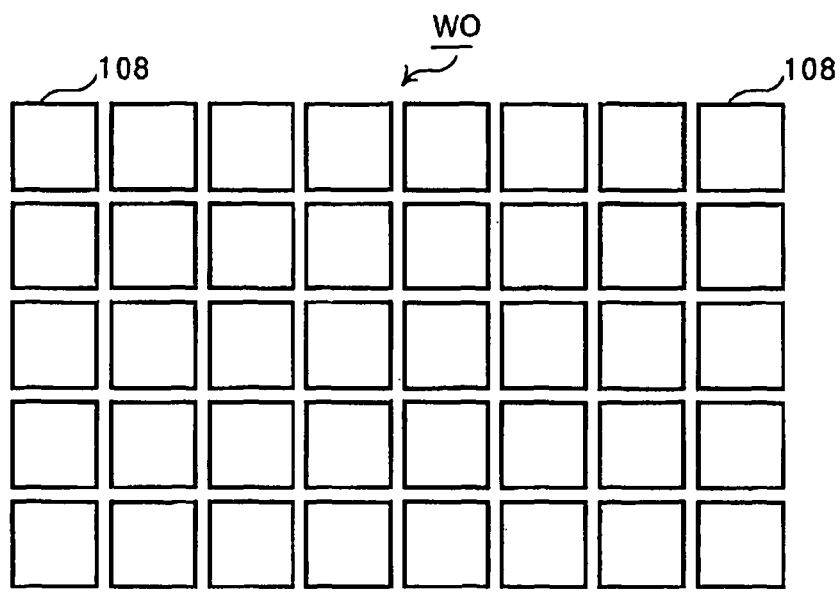
FIG. 3 is an explanatory diagram of a large-scale information processing integrated body.

When respective computers 108 have ISAs that are completely the same or regarded as the same as described above, a load required for calculation of an additional layer of software for achievement of the compatibility among the computers 108 is also avoided and it becomes possible to prevent much of problems resulting from mixing of different computer networks. Therefore, it is preferable that the network system 101 is configured in accordance with its use. In the network system 101, a large-scale information processing integrated body WO is formed in which differences in architecture among the multiple management computers 106 connected to the computer network 104 and the computers 108 are absorbed, each of many computers 108 controlled by each management computer 106 functions as if it is a cell of information processing as shown in FIG. 3, and it is possible to realize broadband processing.

Physically, each computer 108 included in the large-scale information processing integrated body WO is managed by a management computer 106 to which the computer 108 belongs, and operates as an independent computer or cooperatively operates through clustering with another computer 108 controlled by the management computer 106. Logically, however, there is no barrier of the management computer 106 and a cluster can be constituted with other computers 108 controlled by different management computers 106. In the case of clustering in this way, distributed execution of one job among multiple computers 108 belonging to the same cluster becomes possible.

(Distributed Computing)

The present invention provides a mechanism for efficient distributed computing in which the architecture of the network system 101 described above is used. In order to make the mechanism possible, in the present invention, each of the multiple computers 108 constituting the network like the large-scale information processing integrated body WO shown in FIG. 3 serves as a node and it is made possible to repeat "growth", in which the number of nodes is set small at the time of start and increases with the passage of time, and "selective connection" that is an inter-node link connection technique.

The "selective connection" means that when a node that has newly joined the network creates a link, the number of links already linked from a existing node is treated as a criterion for the newly joined node in selecting a link destination node, and the number increases, the possibility for the corresponding existing node to be selected as a destination node also increases. As a result of two features, i.e., the growth and the selective connection, the network possesses a scale-free property while growing. A fact that distribution of the number of links possessed by a node becomes power distribution as a result of such repetition of the growth and the selective connection is described in detail in, for instance, Albert Barabasi, Reka Albert, and Hawoong, "Mean-field theory for scale-free random networks".

Figure 5:
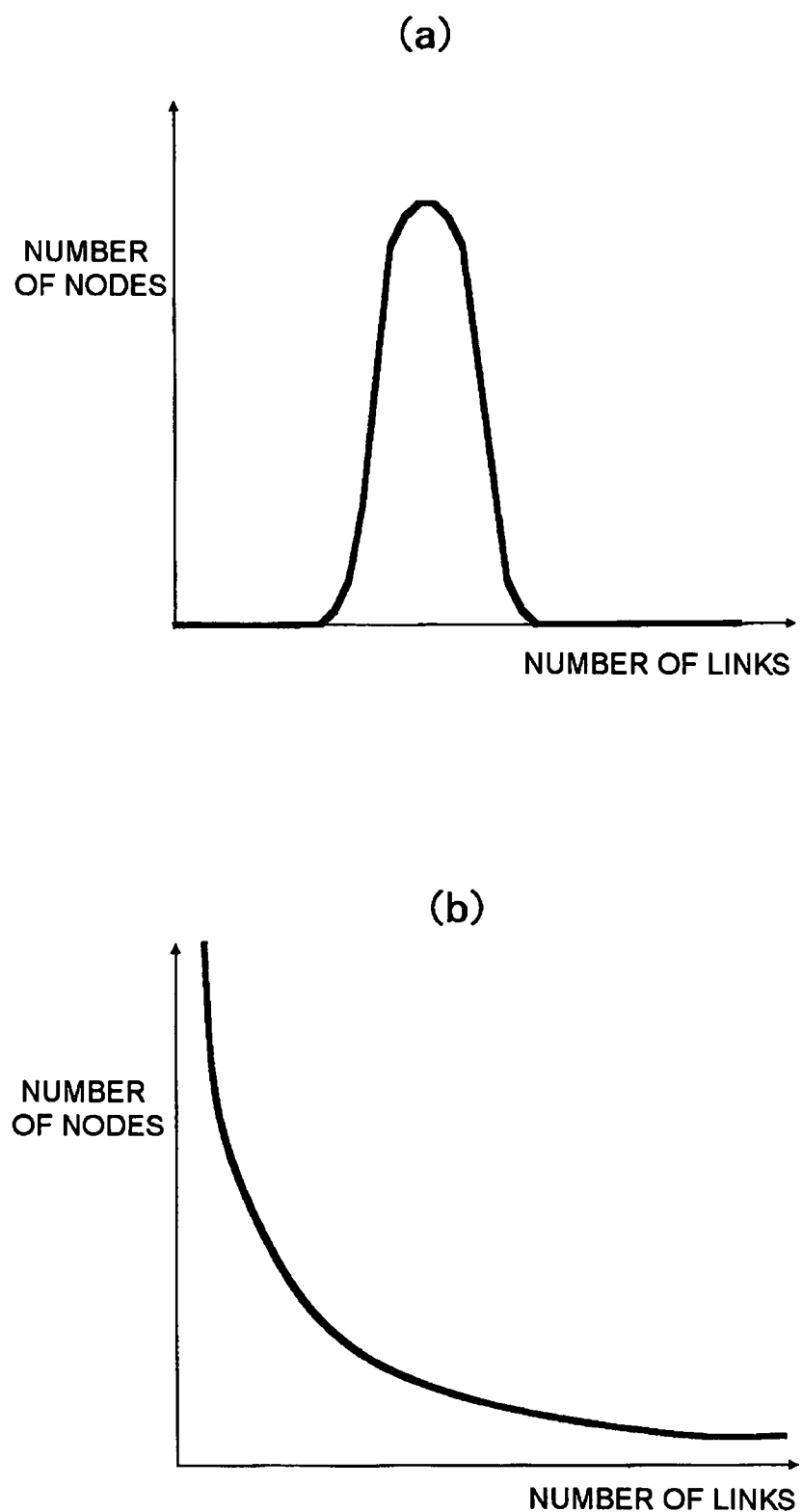
FIG. 5 are each a measured drawing in which the number of links is plotted on a horizontal axis and the number of nodes having the number of links is plotted on a vertical axis, where FIG. 5(*a*) shows an example in the case of random connection and FIG. 5(*b*) shows an example in the case of selective connection.

FIGS. 5(a) and 5(b) are graphs in which measured values are plotted by labeling the numbers of links possessed by nodes in the case of random connection of the nodes and in the case of the selective connection on a horizontal axis and labeling the numbers of nodes having the numbers of links on a vertical axis. FIG. 5(a) shows an example in the case where the nodes are randomly connected. In this example, a representative node having a typical number of links appears. FIG. 5(b) shows an example in the case of the selective connection where no typical node appears and the number of links is distributed in a wide range. In other words, no typical scale appears, so the distribution of FIG. 5(b) is called "scale free" in this sense. The distribution of FIG. 5(b) is expressed as follows and becomes distribution resembling a straight line and having an extremely wide spread when written as a log-log graph:

$$P(k)=AK^{(-r)} \quad (1)$$

where k is the number of links and P(k) is the number of nodes.

In the present invention, through application of the two features described above, each node is interpreted as a cluster and each link is interpreted as two computers 108 included in clusters corresponding to nodes connected to each other. With this interpretation, clustering is performed in a form in which it is possible to have any distribution including the power distribution shown in FIG. 5(b), to allow efficient distributed computing. In a network that grows in this manner, the number of links in a cluster corresponds to the number of computers 108 included in the cluster, in other words, the size of the cluster or the computing capability of the cluster. When the number of computers 108 included in the cluster is plotted on the horizontal axis and the number of clusters or the frequency of the clustering is plotted on the vertical axis, distribution that is analogous to the power distribution shown in FIG. 5(b) should be obtained.

Hereinafter, how each computer 108 should operate and how each management computer 106 should supervise and control an operation of the computer 108 or operations of other management computers 106 of the same type in order to enable the clustering described above will be described.

Each computer 108 is managed with reference to a computer cluster status (clustering enabled/disabled information) indicating whether the current state of the computer 108 is a clustering enabled state. The computer cluster status is recorded on a status table and is updated by the computer 108 or a management computer 106 managing the computer 108 to follow a change of the state of the computer 108. It is sufficient that the status table exists in any memory area that is accessible by the computer 108 or the management computer 106, but the status table may be provided in the storage apparatus of the computer 108.

As examples of the computer cluster status recorded on the status table, in this embodiment, three types of information that are "clustered", "run", and "free" are used. When the computer cluster status is "clustered", it is indicated that the computer has already been clustered and is currently waiting for a job to be executed. When the computer cluster status is "run", it is indicated that the computer is now executing a job. When the computer cluster status is "free", it is indicated that the computer is under a non-operation state. When the computer cluster status is "clustered" or "run", clustering of the computer 108 is impossible. Therefore, information of "clustered" or "run" indicates a clustering disabled state. On the other hand, information of "free" indicates a clustering enabled state.

One role of the management computer 106 is management of each computer 108 under its control, as described above. The management tables 206 are used for the management. As described above, the management tables 206 are stored in the storage apparatus 1061 of the management computer 106, for instance. The maximum number of the management tables 206 included in the management computer 106 corresponds to the number of the computers 108 controlled by the management computer 106.

There are two types of the management tables 206. One of the types of the management tables 206 is a "master table" for storing, when the management computer 106 forms a cluster including one or more computers 108 under its control for the first time, information concerning the state of the cluster. The other of the types of the management tables 206 is a "slave table" for storing, when there exist one or more computers 108 to be added to a cluster formed by another management computer 106, information concerning the state of the cluster.

The management computer 106 acts as a "master management computer" at the time of supervision and control of each computer 108 included in a cluster which is managed by the management computer 106 using the master table. On the other hand, the management computer 106 acts as a "slave management computer" at the time of supervision and control of each computer 108 under its control belonging to a cluster which is managed by another management computer 106 using the slave table. In other words, one management computer 106 acts as multiple types of management computer, the maximum number of which corresponds to the number of computers 108 under its control.

The master table is generated by the management computer 106 acting as the master management computer and the slave table is generated by the management computer 106 acting as the slave management computer. When there exists a slave table, this means that a master table corresponding to the slave table exists in a management computer 106.

Here, examples of the contents of the master table and the contents of the slave table in this embodiment will be described in a concrete manner. FIG. 6(a) shows an example of the contents of the master table 2161 and FIG. 6(b) shows an example of the contents of the slave table 2162.

In the master table 2161, values (values recorded in right fields in FIG. 6(a)) of a cluster ID ("ID" stands for identification information, the same applies to the following description) 2361, a cluster size 2362, a computer list 2363, a cluster status 2364, the maximum number of computers 2365, the minimum number of computers 2366, the total number of computers 2367, and a cluster connection ratio 2368 are each recorded as cluster components (values) by the master management computer.

The cluster ID 2361 is a unique ID given to a cluster formed. It is sufficient that the cluster ID serves as unique information so long as the cluster exists, so it is possible to use, as the cluster ID, a pair of the ID of the master management computer and the ID of a computer 108 included in the cluster for the first time, for instance.

The cluster size 2362 is a value expressing the total number of computers 108 newly or additionally included in the cluster. It is possible to specify the cluster size through counting of the number of computers in the cluster by the master management computer.

The computer list 2363 is a list of the identification information of each computer 108 included in the cluster.

The cluster status 2364 is information indicating the current state of the cluster. In this embodiment, three types of state that are "idle", "run", and "wait" are used as the cluster status. In the case of "idle", the cluster is under a state where it is not executing any job. When the cluster is under this state, addition of the computers 108 to the cluster is possible. In the case of "run", the cluster is under a state where it is executing a job. In the case of "wait", the cluster is under a state where the number of computers 108 held has reached the maximum number of computers. Under these states, addition of the computers 108 to the cluster is impossible.

The maximum number of computers 2365 is the maximum number of computers that can be held by the cluster, and is defined by a user or is defined as a constant held by the system. In the illustrated example, it is shown that the cluster is capable of holding up to 200 computers.

The minimum number of computers 2366 is the minimum number of computers to form the cluster, and is defined by a user or is defined as a constant held by the network system 101. In the illustrated example, it is shown that the cluster is formed by three computers 108.

The total number of computers 2367 is a value expressing the total number of computers 108 that may be included in the cluster and it is possible to obtain the total number of computers 108 from an expected value based on statistics. In the illustrated example, it is shown that there is a possibility that the cluster includes 48 computers 108.

The connection ratio 2368 is information that is an example of addition easiness information. In this embodiment, when there exists a computer 108 (candidate computer) that is a candidate for addition, the computer is added to the cluster with a probability of 20%, for instance. Alternatively, a numeric value, such as a required cluster size/total number of computers, which defines easiness of addition using a probability value or the like is used as the connection ratio. As this numeric value increases, easiness of the addition of the computer 108 to the cluster increases and easiness of growth of the cluster increases. The illustrated example shows the connection ratio (i.e., 0.48) obtained when the current cluster size is set to "23" and the total number of computers is set to "48".

A constant value may be used as the connection ratio 2368. Alternatively, the connection ratio 2368 may be set to a variable value. The value of the connection ratio can be changed from a constant value to a variable value in an ex post facto manner and the reverse is also possible. The connection ratio 2368 of the master table 2161 may be automatically set to a default value at the time of formation of the cluster or may be set to one parameter by an application program causing the cluster to execute a job.

The shape of distribution of a graph in the case where the number of computers 108 included in the cluster is plotted on a horizontal axis and the number of clusters or the frequency of clustering is plotted on a vertical axis as shown in FIGS. 5(a) and 5(b) greatly depends on how the connection ratio is set. For instance, when normal distribution like the distribution shown in FIG. 5(a) is desired, the connection ratio is set to a constant value. Under this setting, the distribution described above becomes normal distribution in which a representative value resides at the center. The connection ratio may be variable as the number of computers added increases and the cluster size increases. For instance, the connection ratio may be set to rise each time one or several computers have been added. In this case, it becomes possible to obtain power distribution like the distribution shown in FIG. 5(b) with ease.

It should be noted that how to set the above-mentioned components of the master table 2161 is merely an example and appropriate increases/decreases are possible.

In the slave table 2162, a cluster ID 2461 and a computer id 2462 are recorded. The cluster ID 2461 is an ID (same as the cluster ID 2361 recorded in the master table 2161) for identifying a cluster. The computer id 2462 is an ID for identifying each computer 108 included in the cluster.

The components (values) recorded in the slave table 2162 is smaller than the number of components of the master table 2161 because the slave table 2162 is linked to the master table 2161 having a cluster ID which is the same as the cluster ID 2461 and therefore it is sufficient that the slave table 2162 gives the cluster ID 2461 and the computer id 2462.

It should be noted that how to set the above-mentioned components (values) of the slave table 2162 is also merely an example and appropriate increases/decreases are possible.

(Operation Form)

Next, an example of an operation form of distributed computing by the network system 101 in this embodiment will be described.

Figure 7:
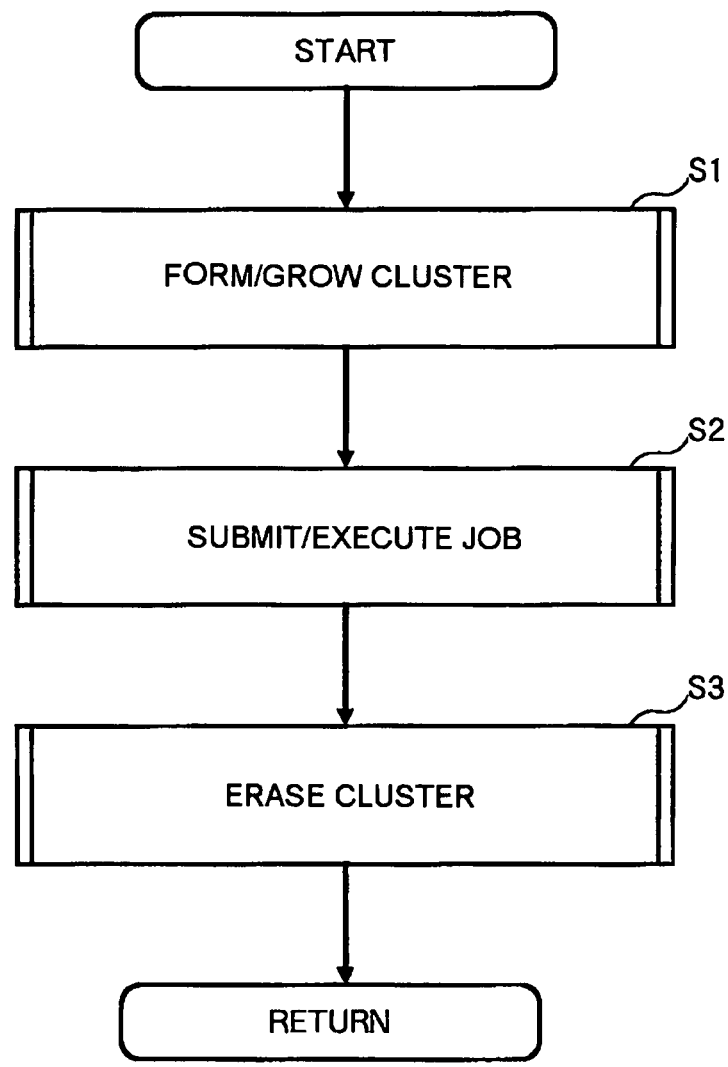
FIG. 7 is a procedural diagram showing the outline of distributed computing according to the embodiment.

In distributed computing according to this embodiment, as shown in FIG. 7, distributed execution of a job is performed while repeating a cycle of cluster state changes in three stages. The state change in the first stage results from formation/growth of a new cluster (Step S1). The state change in the second stage is caused by submitting a job requested from an application program or the like (Step S2). Also, the state change in the third stage is produced by erasing the cluster after execution of the job (Step S3). When the cluster has been erased, every computer 108 that belonged to the cluster until then becomes a candidate computer (node) which can newly belong to another cluster at that point.

The state change to the first stage in this cycle occurs irrespective of the presence or absence of a job. Then, a management computer 106 forms a cluster by serving as a master management computer and grows the formed cluster in cooperation with a slave management computer. The extent of the growth of the cluster is determined by an operation state of each computer 108 and the connection ratio. When the operation state of a computer 108 is "free" and the connection ratio is higher, connection with other computers 108 becomes easier. Hereinafter, details of the state changes in the three stages described above will be explained.

(State Change in First Stage)

(Formation/Growth of New Cluster 1)

FIG. 7 is a procedure explanatory diagram showing a process of formation/growth of a cluster by a master management computer (cluster managing portion 216 of a management computer 106 that serves as the master management computer).

The master management computer checks the operation state of each computer 108 under its control. Specifically, the master management computer checks the computer cluster status recorded in the status table held by the computer 108 (Step S101). Then, the master management computer forms one cluster from several computers 108 under the non-operation state, in other words, computers 108 whose computer cluster statuses are "free" (Step S102). The number of computers to be initially included in the formed cluster is determined by a setting made in advance, for instance. Ordinarily, the master management computer forms the cluster so that some of the computers 108 under its control are not included in the cluster. The computers 108 not included in the cluster are placed under a state where they are to be added to other clusters as much as possible in order to facilitate growth of the other clusters. This state is shown in FIG. 12(a).

Figure 12:
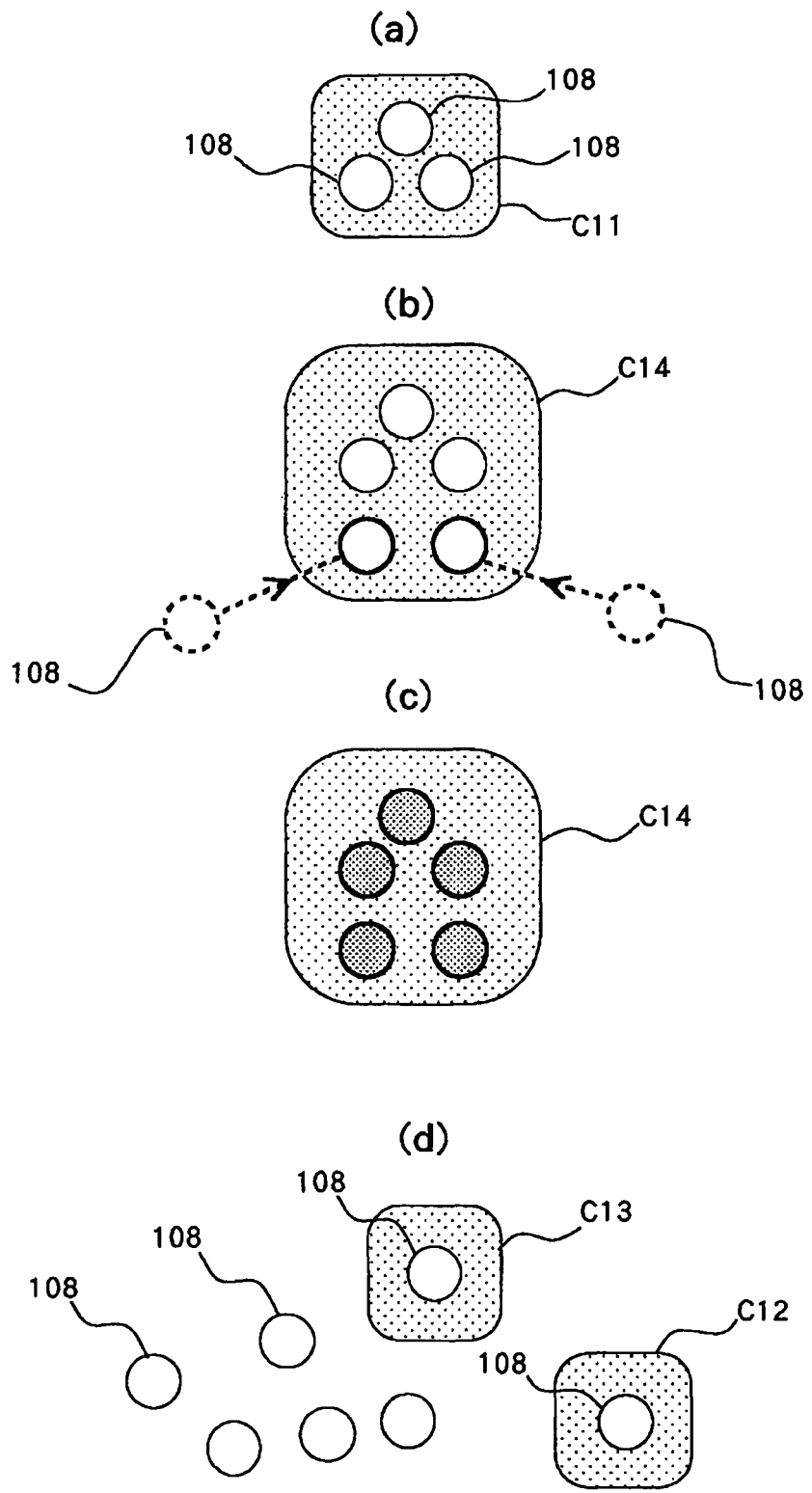
FIGS. 12(*a*) to 12(*d*) are each an explanatory diagram showing a process of cluster formation/growth/erasing according to the embodiment.

In an example shown in FIG. 12(a), one cluster C11 is formed by three computers 108. At this time, the master management computer generates one master table and sets components (values) of this master table (Step S104). When the master management computer is set to manage the status table of each computer 108, the master management computer updates the computer cluster status of every computer 108 included in the cluster from "free" to "clustered" (Step S104).

Following this, the master management computer makes an inquiry to search, from among the computers 108 controlled by another management computer 106 selected at random, for a candidate computer for addition to the cluster formed by itself, in other words, another computer 108 whose computer cluster status is "free" (Step S105). The master management computer conducts the search by, for instance, randomly selecting several other management computers 106 whose logical distances from the master management computer are short and successively widening a range of the selection. When a candidate computer exists (Step S106: Yes), the master management computer checks the connection ratio of the master table, adds the candidate computer to the cluster according to the connection ratio, and records information on the candidate computer in the master table (Step S107). After that, the master management computer updates the computer cluster status of the added candidate computer from "free" to "clustered" (Step S108).

A management computer 106 that manages the added candidate computer becomes a slave management computer of the candidate computer 108 and generates a slave table. A state in the case where the candidate computer exists is shown in FIG. 12(b). In an example shown in FIG. 12(b), two computers 108 are added as the candidate computers and the cluster C11 grows to a cluster C14 which includes five computers 108. The master management computer additionally records information on the added new computers 108 in the master table.

It should be noted that when no candidate computer is found in Step S106 (Step S106: No), the master management computer returns to the processing of Step S105.

(Formation/Growth of New Cluster 2)

Figure 9:
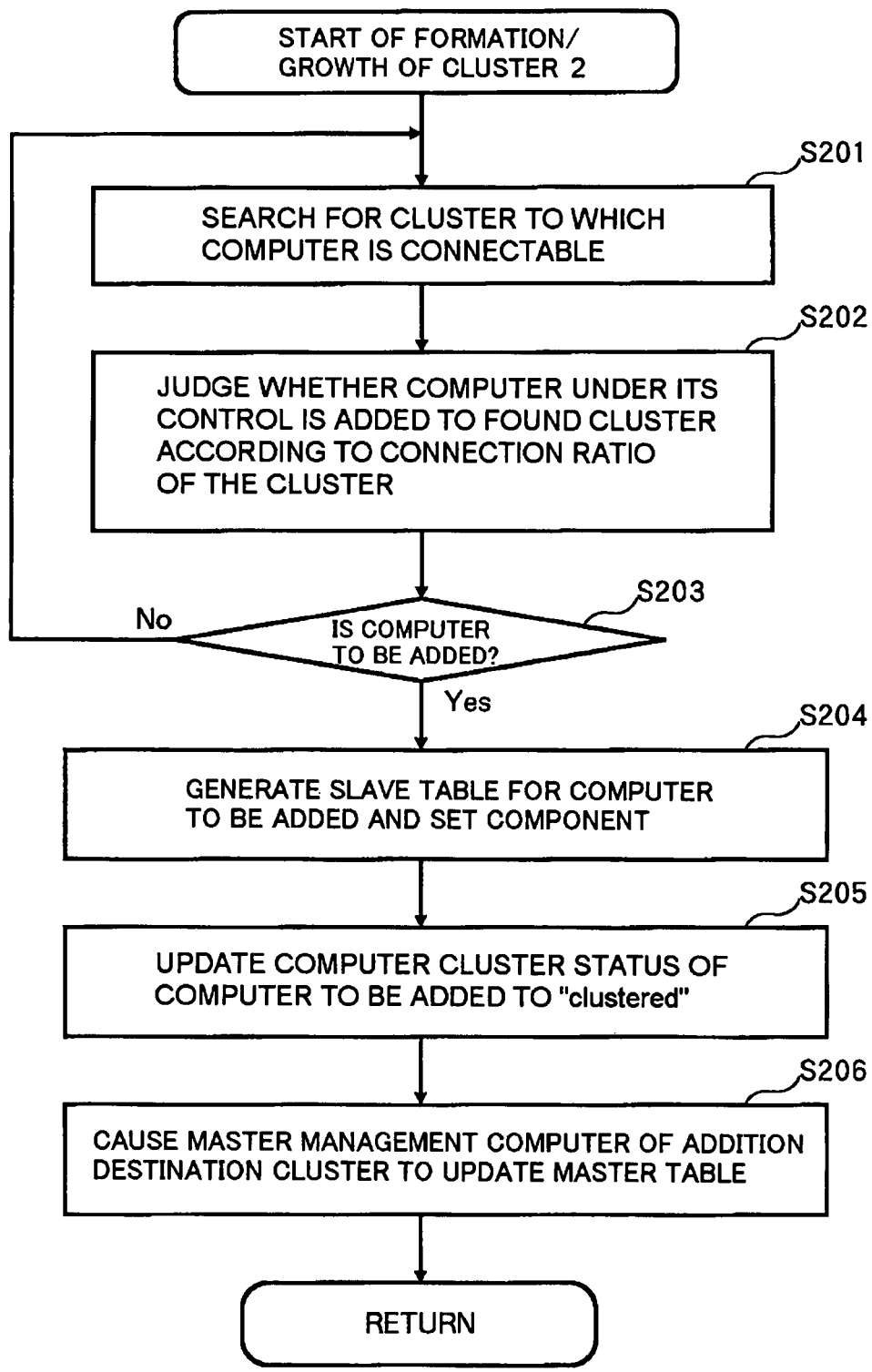
FIG. 9 is an explanatory diagram of a procedure of cluster formation/growth by the management computer.
Figure 10:
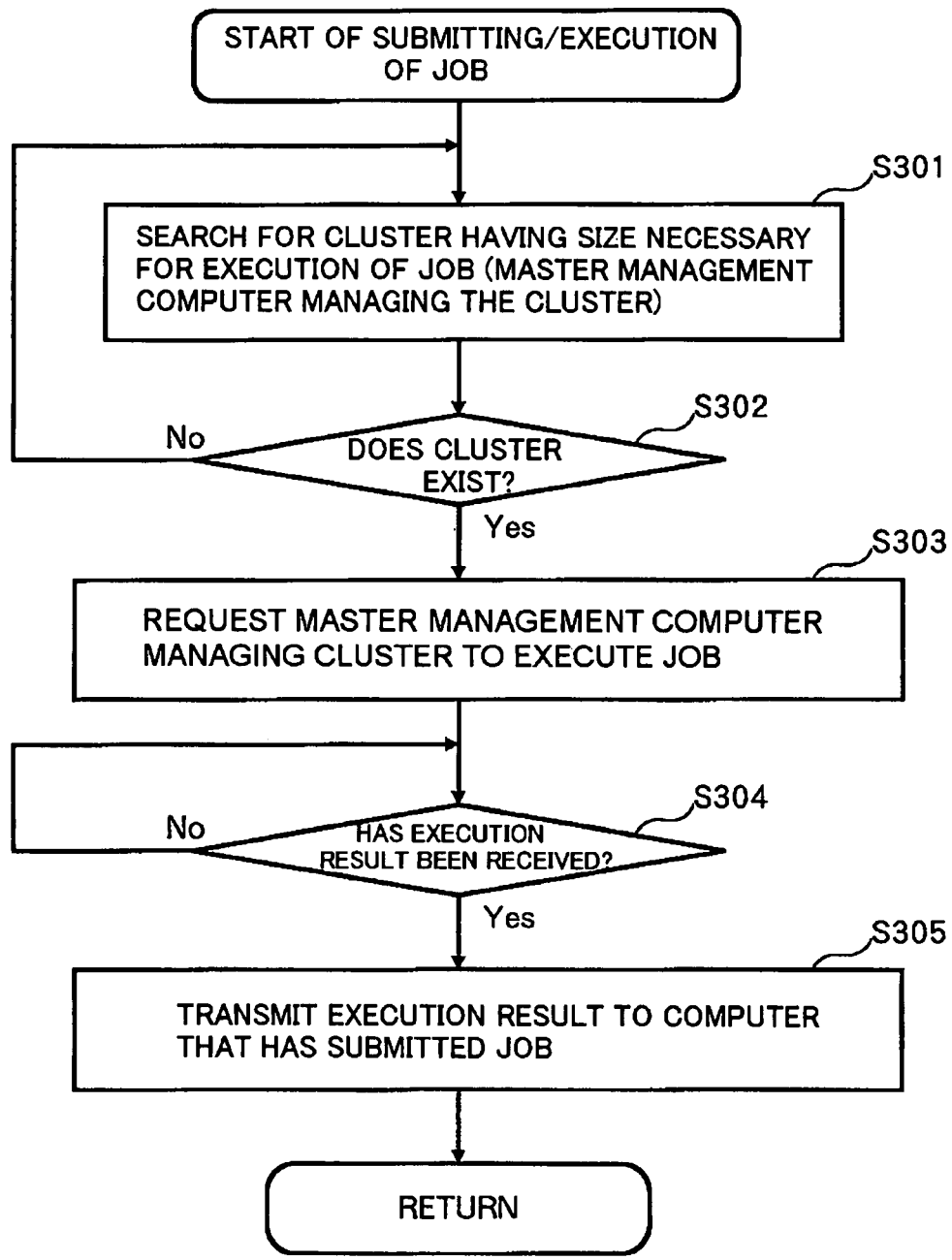
FIG. 10 is an explanatory diagram of a procedure of job submitted and execution by the management computer.
Figure 11:
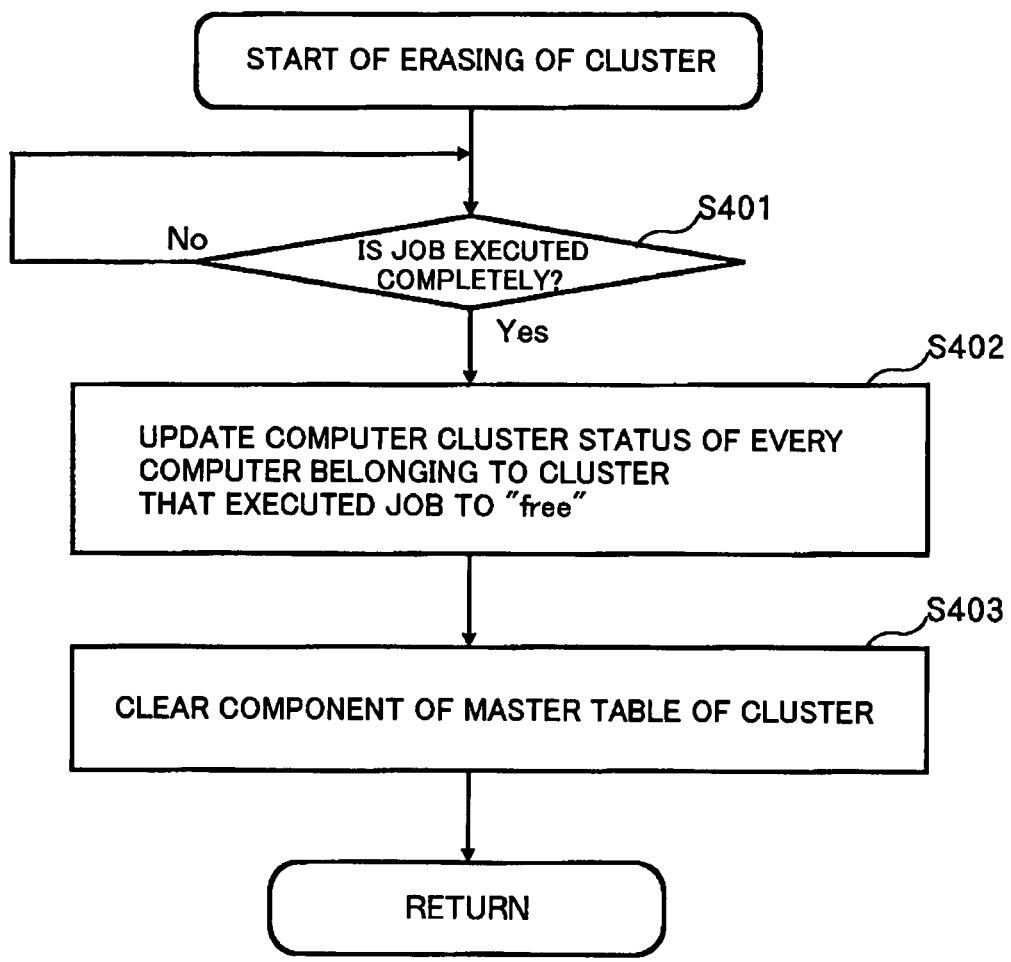
FIG. 11 is an explanatory diagram of a processing procedure at the time of cluster erasing by the management computer.

FIG. 9 is a procedure explanatory diagram showing a cluster growth process by a management computer 106 that does not serve as a master management computer.

Figure 8:
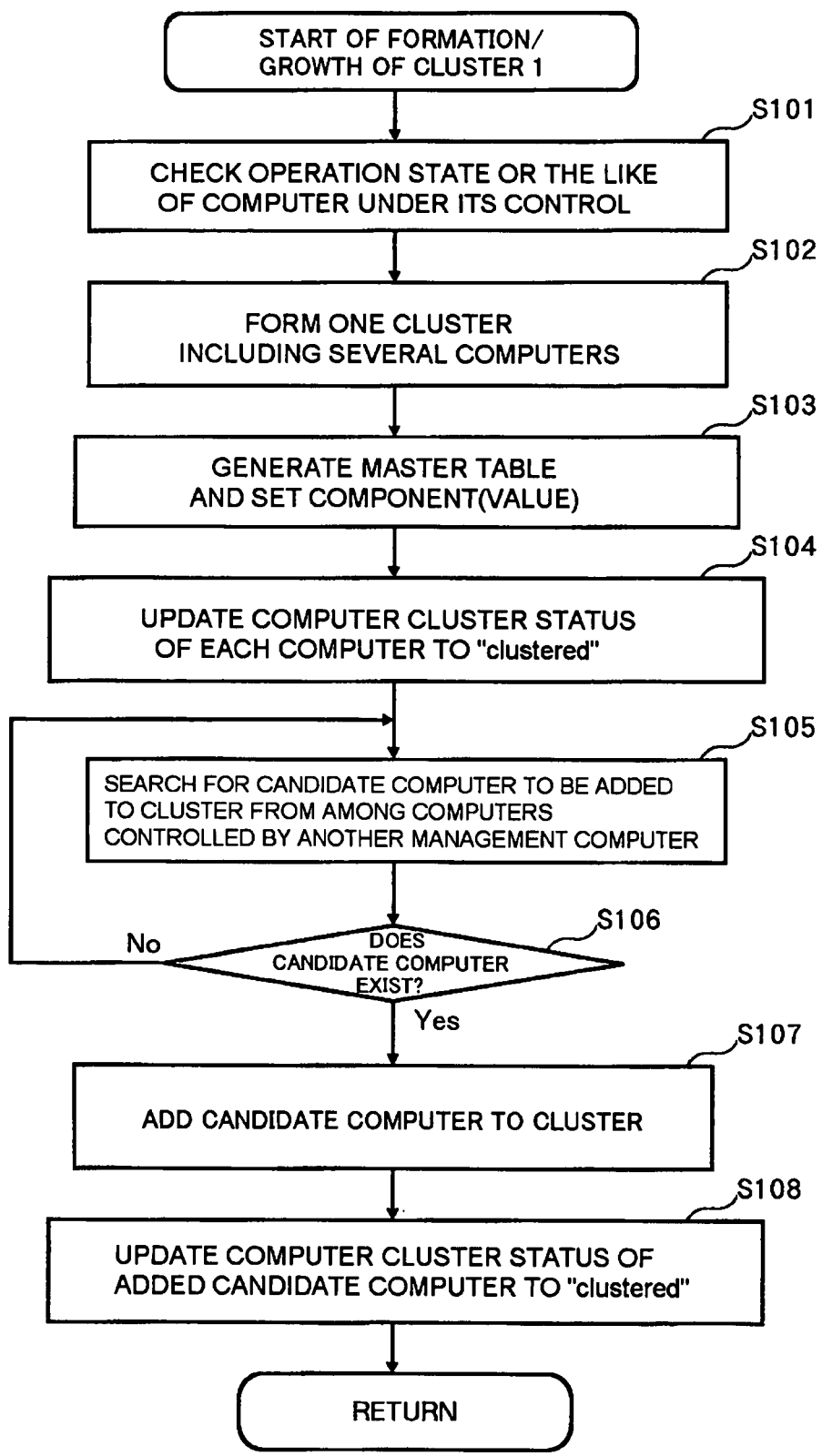
FIG. 8 is an explanatory diagram of a procedure of cluster formation/growth by the management computer.

In principle, the cluster growth is realized through active behavior of a master management computer, as shown in FIG. 8. However, it is also possible to achieve the cluster growth when a management computer 106 which does not serve as a master management computer accesses a master management computer.

Specifically, a management computer 106 that controls not-clustered computers 108 searches for a cluster to which it is possible to add the computers 108 by, for instance, making an inquiry to another management computer 106 selected at random (Step S201). Then, according to the connection ratio of an addition destination cluster, the management computer 106 determines whether the computers 108 under its control are added to the cluster (Step S202). When it is determined that the computers 108 are not added, the management computer 106 returns to Step S201 (Step S203: No).

When it is determined that the computers 108 are added, the management computer 106 becomes a slave management computer of the computers 108 with respect to the connection destination cluster. Therefore, the management computer 106 generates a slave table for the computers 108 and sets each component (value) in this slave table (Step S204). Then, the management computer 106 updates the computer cluster status of each added computer 108 from "free" to "clustered" (Step S205). In addition, the management computer 106 causes a master management computer of the cluster, to which the computers are added, to update the master table (Step S206). Note that this update may be made by the management computer 106 itself through access from the slave management computer to the master management computer.

(State Change in Second Stage)

(Submitting of Job)

The state change in the second stage starts with an action by a management computer 106 in which a job has been submitted response to a request from an application or the like. On the occasion of execution of the job, a computation amount and required time that are necessary for the execution of the job, an example of which is the number of computers 108, become parameters. These parameters may be automatically generated by the processor of the management computer 106 according to the size of the submitted job or may be appropriately given by a user who uses an application or the like. Parameters that an application possesses may be used.

FIG. 9 is a procedure explanatory diagram showing how a management computer 106 in which a job has been submitted uses a cluster. The management computer 106 searches for a master management computer forming a cluster having a required size by referring to the cluster list 208 based on the computation amount described above or by making an inquiry to another management computer (Step S301). When the master management computer has been found (Step S302: Yes), the management computer 106 requests the master management computer to execute the job (Step S303). The management computer 106 requests for the execution of the job by, for instance, sending a packet which contains the job, a program and data necessary for the execution of the job, and a designated address used for sending a result of the execution to the management computer 106 itself, to the master management computer.

The master management computer updates the computer cluster status of each computer 108 belonging to the cluster that executes the job from "idol" or "wait" to "run" and then starts the execution of the job through distributed processing by the computer 108. FIG. 12(c) shows a state where a master management computer managing the cluster C14 grown as shown in FIG. 12(b) executes a job. A result of the execution of the job is sent from the master management computer to the management computer 106 that has requested the job execution. Upon reception of the execution result (Step S304: Yes), the management computer 106 transmits the execution result to a computer that has submitted the job (Step S305).

It should be noted that when the job has been submitted directly to the master management computer which manages the cluster having a required size, the above-described Steps S301 to S304 are performed by the master management computer itself. When it is judged in Step S302 that it is required to execute the job across multiple clusters, for instance, when it is judged that it is required to execute image processing and audio processing using different clusters, the job execution request is issued to each of master management computers managing the clusters.

(State Change in Third Stage)

(Erasing of Cluster)

Erasing of a cluster that has executed a job is performed by a master management computer managing the cluster. FIG.

11 shows a procedure of processing performed by the master management computer at the time of erasing of the cluster.

When the execution of the job has been completed (Step S401: Yes), the master management computer updates the computer cluster status of every computer 108 included in the cluster that has executed the job until then to "free" (Step S402). In addition, the master management computer clears components (values) of the cluster recorded in the master table. At the same time, the master management computer clears components (values) recorded in the slave table through each slave management computer that controls the computers that belonged to the cluster. In other words, the master management computer restores every computer to a state before formation of the cluster (Step S403). As a result, all computers 108 that belonged to the cluster are placed under a non-operation state and a clustering enabled state, with certain computers 108 being clustered immediately and the other computers 108 remaining under a state where they can be added to clusters. FIG. 12(d) shows this state.

As described above, according to this embodiment, even in a network system that has many uncertainties, in which, at least one of the size, the type, and the number of submitted jobs is expected to change every moment, each of multiple management computers 106 existing in the network system forms a cluster having an optimum size and grows the formed cluster while acting as an master management computer or a slave management computer for each computer 108 under its control, so it becomes possible to assign execution of a job to a cluster having an appropriate size, which enables effective job execution. Also, it becomes possible to equally cope with every process by following a uniform procedure regardless of the size of the process, which enables realization of highly flexible distributed computing. In particular, when process size distribution is power distribution, a setting, with which a cluster size also has power distribution, is possible by making addition easiness information variable, so it becomes possible to carry out a process most effectively, which enables enhancement of the use efficiency of computer resources.
(Modifications)

In the example described above, for ease of explanation, the description has been made on the precondition that each computer 108 holds the status table and each management computer 106 holds the management tables 206 (master table/slave table). However, it is sufficient that these tables exist in memory areas accessible from the computer 108 and the management computer 106. For instance, the management computer 106 may hold the status table of each computer 108 under its control and the management tables 206 may be collectively stored in a server or the like accessible by the table managing portion 212 of the management computer 106.

Also, in the above example, whether a candidate computer controlled by a slave management computer is added to a cluster is determined by the slave management computer. However, every determination of whether a candidate computer is added to a cluster may be made at a master management computer.
(Embodiment in the Case of not Depending on Management Computer)

In the above description, an example of the network system 101 composed of a collection of the management computers 106 that control multiple computers 108 has been explained. However, it is also possible to implement the present invention as a network system in which each of the multiple computers 108 is capable of joining and withdrawing from a cluster without the mediation of the management computer 106.

When the present invention is implemented as the network system, the connection ratio is also recorded in the status table of each computer 108 and the computer 108 additionally performs management of the status table by itself. For instance, when the computer 108 adds itself to a cluster formed by other computers 108, the computer 108 updates its computer cluster status to "clustered". Then, upon completion of execution of a job by the cluster, the computer 108 restores its computer cluster status to "free". Also, a function that is the same as that of the management computer 106 described above is given to the computer 108. In other words, when the computer 108 initiatively forms a cluster, the computer 108 generates a master table for storing the contents of the cluster.

The computer 108 that has formed the cluster searches for another candidate computer that is a candidate for addition, whose latest computer cluster status recorded in the status table held by another computer is "free", and determines whether the candidate computer specified through the search is added based on the connection ratio of the cluster. The computer 108 that has formed the cluster causes the cluster, which has grown in this manner, to execute a job. Then, after completion of the execution, the computer 108 erases the cluster.
(Embodiment Based on Multiprocessor/Multicore Processor)

It is also possible to implement the present invention as a network system composed of multiple processors or multicore processors. In this case, it is sufficient that as shown in FIG. 13(a) as an example, an internal bus is caused to function as the computer network 104 described above, one or more of processors or multicore processors connected to the internal bus are caused to operate as the management computers 106 described above, and the remaining processors or the like are caused to operate as the computers 108 described above.

Figure 13:
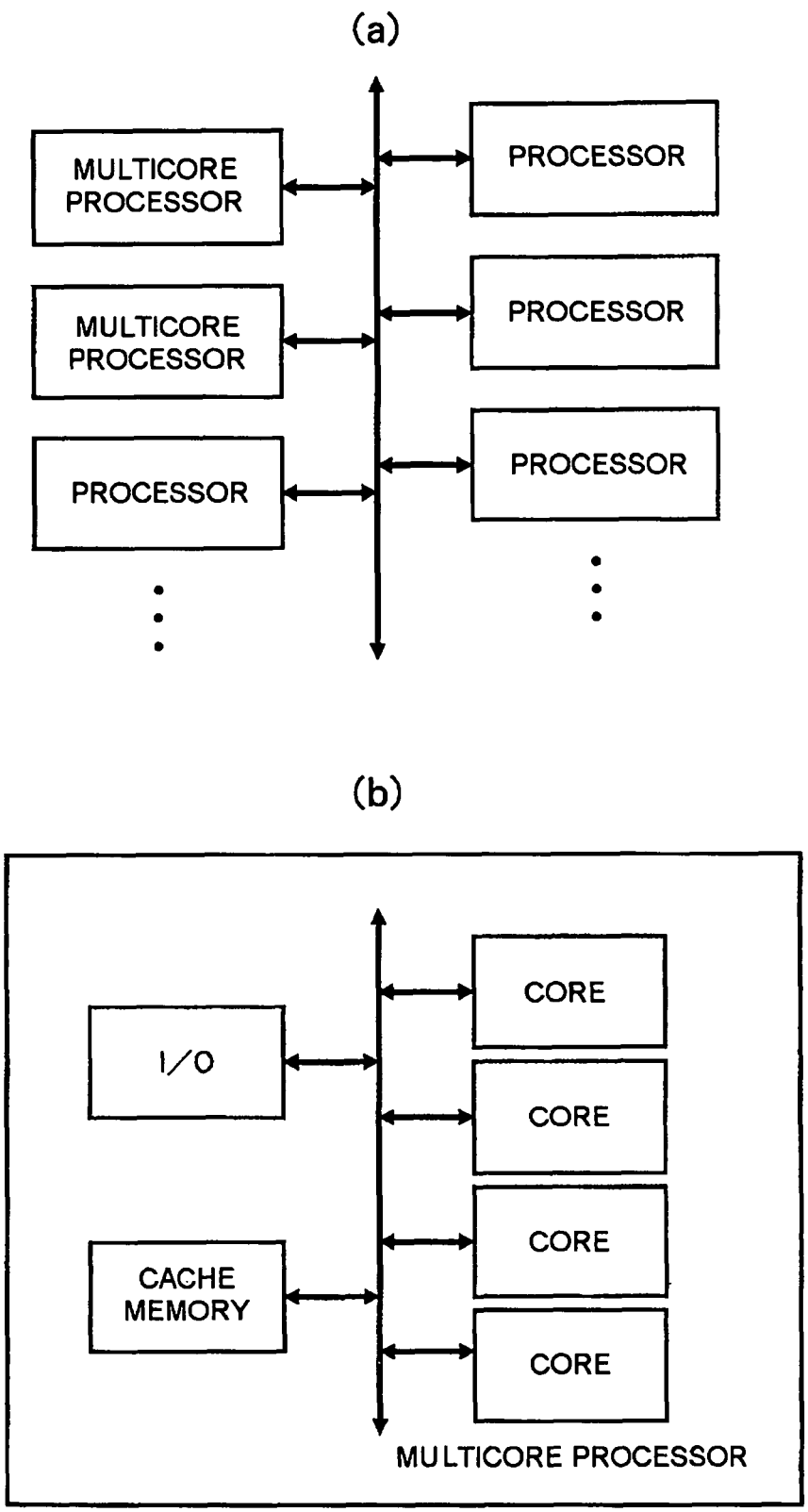
FIG. 13(*a*) shows the outline of a network system realized by a multiprocessor and FIG. 13(*b*) shows the outline of a network system achieved by a single multicore processor.

It is further possible to implement the present invention by setting each multicore processor shown in FIG. 13(b), as a network system. In this case, it is sufficient that the operation of the management computers 106 described above is realized by one or more cores (processor cores), an input/output control portion (I/O), and a cache memory which are connected to an internal bus and the remaining cores are caused to operate as the computers 108 described above.

Another Embodiment

An embodiment of the network system according to the present invention is also possible in which when a computer 108 of a cluster accesses another cluster, the computer 108 is added to a different cluster associated with the other cluster. A mode in this embodiment is called a "duplication mode". This duplication mode is described in detail in a document given below.

Title: Growing networks with local rules: preferential attachment, clustering hierarchy and degree correlations Writer: Alexei V'azquez Name of magazine: Phys Rev E Stat Nonlin Soft Matter Phys. 2003 May; 67(5 Pt2): 056104. Epub 2003 May 7.

In the duplication mode, instead of the connection ratio 2368 described above, a cluster list is used in which identification information (connection addresses or the like) of clusters with which computers belonging to other clusters accessed are associated has been listed. The cluster list is provided for the master table, for instance.

FIG. 14 shows an example of the contents of the master table of this case. This master table 2163 includes a cluster list 2369 in addition to the cluster ID 2361, the cluster size 1262, the computer list 2363, the cluster status 2364, the maximum number of computers 2365, and the minimum number of computers 2366 that are the same as the contents of the master table 2161 shown in FIG. 6(*a*). Each time a new cluster is associated with a cluster managed by a master management computer, the master management computer lists identification information of the new cluster in the cluster list 2369. The situation where "a certain cluster is associated with another cluster" in this embodiment refers to a situation where a computer belonging to the certain cluster and a computer belonging to the other cluster are logically connected to each other (communicate with each other) and cooperative processing or the like is possible.

The master management computer reads out identification information of a cluster listed in the cluster list 2369 in response to a request from a slave management computer and informs the slave management computer of the identification information, for instance. In an application in which a not-so-high security level is sufficient, the cluster list 2369 may be browsed by, for instance, the slave management computer.

It does not matter whether this reading out from the cluster list 2369 is performed in a random order or in a predetermined order. In the former case, there occurs no problem even when identification information of clusters is listed in the cluster list 2369 in an arbitrary order. On the other hand, in the latter case, the order, in which the cluster identification information is listed, is weighted. For instance, a cluster having higher relationship with the contents of processing by a cluster managed by the master management computer is read out with a higher priority. It is possible to determine the relationship in this case based on the number of times of access among clusters, the number of times of communication within a predetermined time among the clusters, the degree of relation of distributed processing among the clusters (for instance, audio processing that should be synchronized with image processing), or the like, for instance.

An operation form in the duplication mode is described as follows, for instance.

Figure 15:
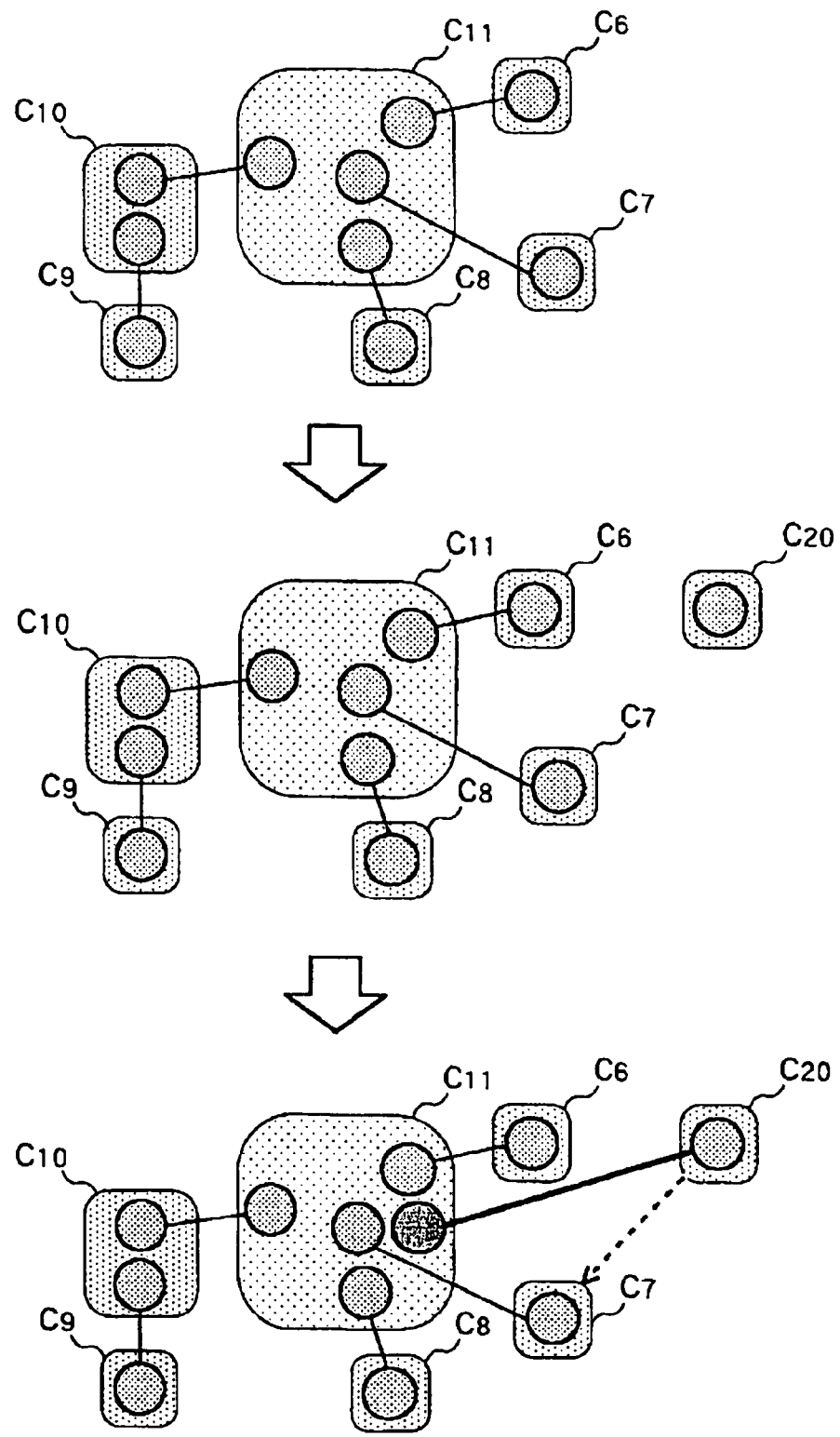
FIG. 15 shows an example of an operation form in the duplication mode.

It is assumed that the network system is currently under an initial state shown in the upper area of FIG. 15. In an example shown in FIG. 15, multiple clusters C6 to C11 have already been formed. To each of the clusters C6 to C11, one or multiple computers (computers 108 described above, the same applies to the following description) belong.

It is assumed that under this state, a new cluster C20 is formed in the network system, as shown in the middle area of FIG. 15. It is assumed that a management computer that has formed the cluster C20 manages not only a computer belonging to the cluster C20 but also several computers for facilitating growth of other clusters, in other words, candidate computers (not shown). When a candidate computer is provided to another cluster, a management computer managing the candidate computer becomes a slave management computer, as already mentioned.

The management computer managing the cluster C20 finds the cluster C7 from among the clusters C6 to C11. Then, the management computer makes an inquiry to a master management computer managing the cluster C7, thereby obtaining information about association between the cluster C7 and other clusters recorded in the master table 2163. In the case of the example shown in the middle area of FIG. 15, the cluster C7 is associated only with the cluster C11. Therefore, the management computer managing the cluster C20 adds a candidate computer to the cluster C11 and associates this candidate computer and the cluster C20 (computer belonging thereto) with each other (lower area of FIG. 15). Also, the management computer updates the contents of the slave table that it holds.

Meanwhile, a master management computer managing the cluster C11 adds the newly added computer (candidate computer before the addition) to the computer list 2363 in the master table 2163 and adds the identification information of the cluster C20 to the cluster list 2369.

A case where the cluster C20 and the cluster C11 (computers of the clusters) are associated with each other on a one-to-one basis has been described above as an example but an association method is not limited to the one-to-one association and one-to-N (N is a natural number of two or greater) association is also possible. Also, this association does not relate to physical connection among computers in a console.

Figure 16:
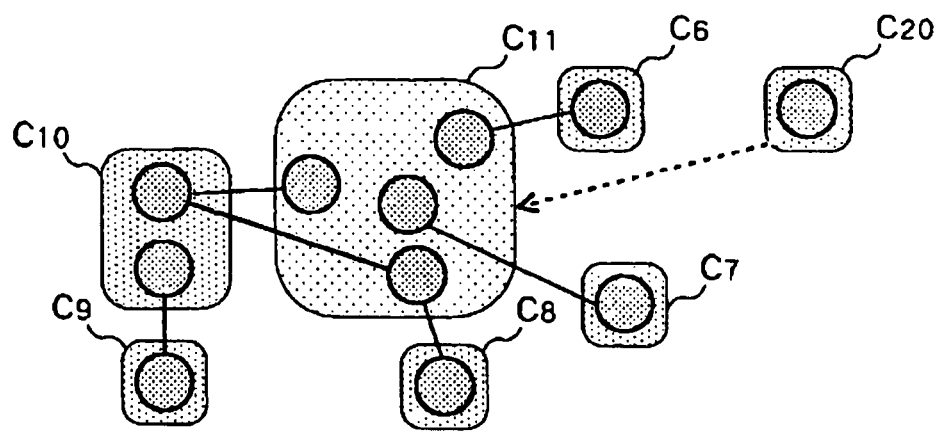
FIGS. 16(*a*) and 16(*b*) each show another example of the operation form in the duplication mode.
Figure 16:
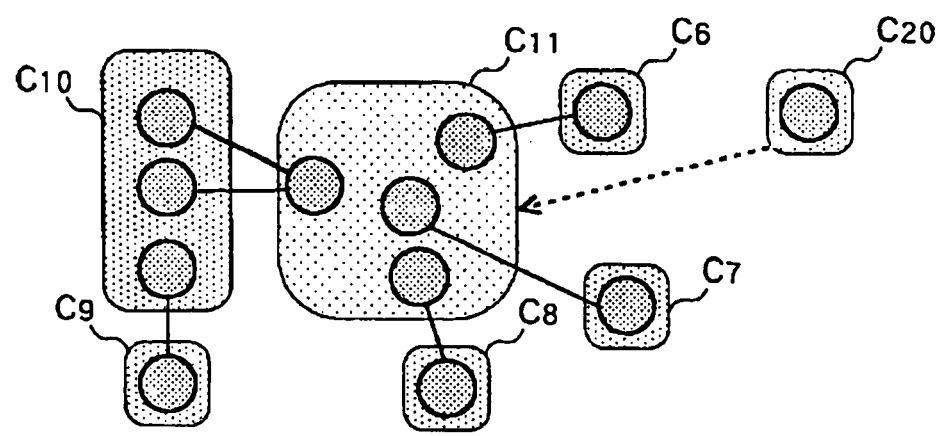

For instance, it is assumed that when a cluster C20 to which a computer that newly joining the network system belongs is formed as shown in FIG. 16(*a*), a management computer managing the cluster C20 reaches a cluster C11 at the time of searching for a cluster to which a candidate computer under its control is to be added. When clusters C6 and C7 associated with computers included in the cluster C11 on a one-to-one basis as well as clusters C8 and C10 associated with multiple computers included in the cluster C11 are listed in the cluster list of the cluster C11, the candidate computer is added to one of the clusters C6, C7, C8, and C10. The same applies to a case shown in FIG. 16(*b*).

It should be noted that in these cases, information recorded in the slave table and the master table is updated like in the case of the example shown in FIG. 15.

In the duplication mode, an operation form is also possible in which the cluster list 2369 and the computer list 2363 are used in combination. Hereinafter, an example of this operation form will be described.

The same processing as in the case of the example shown in FIGS. 16(*a*) and 16(*b*) is performed until a new cluster C20 which joins the network system is formed, and a management computer managing the cluster C20 reaches a cluster C11 on the occasion of searching for a cluster to which a candidate computer under its control is to be added.

Figure 17:
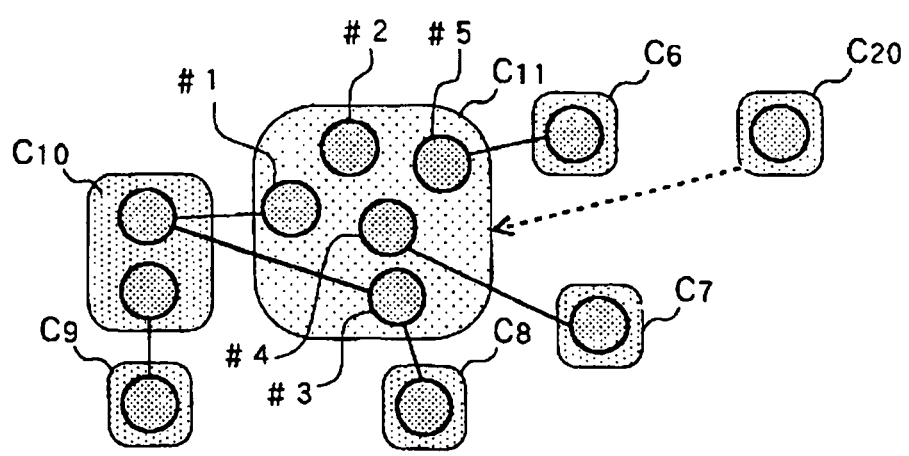
FIG. 17 shows still another example of the operation form in the duplication mode.

It is assumed that as shown in FIG. 17, according to the computer list 2363 of the cluster C11, computers #1 to #5 belong to the cluster C11 and according to the cluster list 2369, the computers #1 and #3 are associated with the cluster C10, the computer #4 is associated with the cluster C7, the computer #5 is associated with the cluster C6, and the computer #2 is not associated with any cluster. Other forms are possible but if reading out of the computer list 2363 is also performed in a random order, when the computer #1 is selected from the computer list 2363, the candidate computer is added to the cluster C10 associated with the computer #1. Note that when the computer #2 is selected, there exists no cluster associated with this computer, so the selection is carried out again.

In the duplication mode, even when the connection ratio 2368 is not set, clustering that follows power distribution becomes possible, so such an effect is produced that addition of a computer to a cluster becomes smoother.

INDUSTRIAL APPLICABILITY

The present invention is applicable to a network system for facilitating clustering in which the number of nodes connecting computers to each other follows normal distribution, power distribution, or the like. In addition, the present invention is also applicable to all kinds of distributed computing capable of efficiently executing information processing of jobs whose sizes, types, and number change every moment.

The invention claimed is:

1. A network system, which is joined and left by a plurality of computers each of which is capable of being clustered with another computer, the network system comprising:
   a storage apparatus comprising a first table for storing clustering enabled/disabled information indicating whether a state of each computer is a clustering enabled state;
   the storage apparatus comprising a second table for storing addition easiness information indicating a probability value in adding another computer to a cluster which has already been formed by at least one of the plurality of computers, the probability value is a ratio of a required cluster size of the formed cluster to a total number of computers in the formed cluster, wherein one of the computers includes a cluster forming unit configured to form a cluster including the computer itself and another computer indicated as being under the clustering enabled state by the clustering enabled/disabled information on the first table, and updating the clustering enabled/disabled information on every computer included in the formed cluster to information indicating a clustering disabled state, and storing the addition easiness information on the formed cluster on the second table,
   and wherein the computer that formed the cluster includes a cluster growing unit configured to, when a candidate computer that is a candidate for addition to the cluster exists, determine whether the candidate computer is to be added to the cluster according to the addition easiness information recorded on the second table,
   wherein the cluster growing unit causes the probability value to vary with the addition of the candidate computer to the cluster as a trigger.

2. A network system according to claim 1, wherein the computer that formed the cluster further includes a cluster erasing unit configured to, upon completion of execution of a job by the cluster, erase the cluster and returning the addition easiness information recorded on the second table and the clustering enabled/disabled information on every computer, which belonged to the erased cluster, recorded on the first table to states before the formation of the cluster.

3. A network system according to claim 1, wherein the addition easiness information is a numeric value obtained by quantifying a degree of easiness of the addition, and wherein the cluster growing means increases the easiness degree of the addition of the candidate computer to the cluster as the numeric value increases.

4. A network system according to claim 3, wherein the cluster growing means maintains the numeric value at a constant value regardless of the addition of the candidate computer.

5. A network system according to claim 3, wherein the cluster growing means sets the numeric value variable after the numeric value has been recorded on the second table.

6. A network system, which is joined and left by a plurality of management computers each of which controls one or a plurality of computers, each capable of being clustered with another computer, as a computer or computers which belong to the management computer, the network system comprising:
   a first table for storing clustering enabled/disabled information indicating whether a state of each computer is a clustering enabled state; and
   a second table for storing addition easiness information indicating a probability value in adding another computer to a cluster which has already been formed by one or a plurality of computers, the probability value is a ratio of a required cluster size of the formed cluster to a total number of computers in the formed cluster,
   wherein at least one management computer includes a cluster forming unit configured to form a cluster including a computer under its control and a computer controlled by another management computer indicated as being under the clustering enabled state by the clustering enabled/disabled information on the first table, and updating the clustering enabled/disabled information on every computer included in the formed cluster to information indicating a clustering disabled state,
   and wherein the management computer that formed the cluster includes a cluster growing unit configured to, when a candidate computer that is a candidate for addition exists, determine whether the candidate computer is to be added to the cluster according to the addition easiness information recorded on the second table,
   wherein the cluster growing unit causes the probability value to vary with the addition of the candidate computer to the cluster as a trigger.

7. A network system according to claim 6, wherein the management computer that formed the cluster further includes a cluster erasing unit configured to, upon completion of execution of a job by the cluster, erase the cluster and returning the addition easiness information recorded on the second table and the clustering enabled/disabled information on every computer, which belonged to the erased cluster, recorded on the first table to states before the formation of the cluster.

8. A network system according to claim 7, wherein one of the management computers holds at least one second table, the maximum number of which is the number of computers under its control.

9. A network system according to claim 8,
   wherein each second table includes at least one of a master table and a slave table, the master table being, when a management computer holding the second table forms a first cluster including a first computer under its control, generated for the first computer, and the slave table being, when the management computer holding the second table supervises and controls an operation of a second computer under its control added to a second cluster formed by another management computer, generated for the second computer,
   wherein the addition easiness information is recorded on the master table,
   and wherein the management computer holding the master table acts as a master management computer for initiatively performing information processing concerning the formation of the first cluster, changing of a number of computers in the first cluster, and erasing of the first cluster, while the management computer holding the slave table acts as a slave management computer with respect to the second cluster.

10. A network system according to claim 9, wherein the master management computer includes a search unit configured to search for a candidate computer for addition to the first cluster by inquiring of a management computer whether a computer under a clustering enabled state exists.

11. A network system according to claim 9, wherein one of the management computers determines, according to the addition easiness information on the first cluster formed by the master management computer, whether a candidate computer under its control is to be added to the first cluster.

12. A network system according to claim 9, wherein the addition easiness information is a numeric value obtained by quantifying a degree of easiness of the addition of the candidate computer to the first cluster, and wherein the cluster growing means of the master management computer increases the easiness degree of the addition of the candidate computer to the first cluster as the numeric value increases.

13. A network system according to claim 12, wherein the cluster growing means maintains the numeric value at a constant value regardless of the addition of the candidate computer.

14. A network system according to claim 12, wherein the cluster growing means sets the numeric value variable after the numeric value has been recorded on the second table.

15. A management computer, which controls one or a plurality of computers, each capable of being clustered with another computer, as a computer or computers which belong to the management computer, the management computer comprising:
  a network connecting unit configured to establish connection to a computer network that the management computer is capable of joining and leaving together with another management computer having the same type of function;
  a table managing unit configured to enable access to a first table for storing clustering enabled/disabled information indicating whether a state of each computer is a clustering enabled state and a second table for storing addition easiness information indicating a probability value in adding another computer to a cluster which has already been formed by one or a plurality of computers, the probability value is a ratio of a required cluster size of the formed cluster to a total number of computers in the formed cluster;
  a cluster forming unit configured to form a cluster including one of the computers under its control and one of the computers controlled by another management computer indicated as being under the clustering enabled state by the clustering enabled/disabled information on the first table, updating the clustering enabled/disabled information on every computer included in the formed cluster to information indicating a clustering disabled state, and storing the addition easiness information on the cluster on the second table; and
  a cluster growing unit configured to, when a candidate computer that is a candidate for addition exists, determine whether the candidate computer is to be added to the cluster according to the addition easiness information recorded on the second table,
  wherein the cluster growing unit causes the probability value to vary with the addition of the candidate computer to the cluster as a trigger.

16. A management computer according to claim 15, further comprising cluster erasing unit configured to, upon completion of execution of a job by the formed cluster, erase the cluster and returning the addition easiness information recorded on the second table and the clustering enabled/disabled information on every computer, which belonged to the erased cluster, recorded on the first table to states before the formation of the cluster.

17. A cluster management method for use in a network system which is joined and left by a plurality of computers each of which is capable of being clustered with another computer, the cluster management method comprising the steps of:
  storing, by each computer, on a first table, clustering enabled/disabled information indicating whether its state is a clustering enabled state;
  forming, by one of the computers, a cluster including the computer and another computer indicated as being under the clustering enabled state by the clustering enabled/disabled information on the first table;
  updating, by the computer, the clustering enabled/disabled information on every computer included in the formed cluster to information indicating a clustering disabled state;
  storing, by the computer, addition easiness information indicating a probability value in adding another computer to the cluster on a second table, the probability value is a ratio of a required cluster size of the formed cluster to a total number of computers in the formed cluster; and
  determining, when a candidate computer that is a candidate for addition exists, whether the candidate computer is to be added to the cluster according to the addition easiness information recorded on the second table,
  wherein the probability value varies with the addition of the candidate computer to the cluster as a trigger.

18. A cluster management method according to claim 17, further comprising the steps of:
  erasing, by the computer that formed the cluster, the cluster upon completion of execution of a job by the cluster; and
  returning, by the computer, the addition easiness information recorded on the second table and the clustering enabled/disabled information on every computer, which belonged to the erased cluster, recorded on the first table to states before the formation of the cluster.

19. An article comprising a non-transitory machine readable tangible medium having embodied thereon a computer program, the computer program being executable by a computer included in a network system which is joined and left by a plurality of computers each of which is capable of being clustered with another computer, the computer program being executable by the computer to perform:
  a table managing step for enabling access to a first table for storing clustering enabled/disabled information indicating whether a state of each computer is a clustering enabled state and a second table for storing addition easiness information indicating a probability value in adding another computer to a cluster which has already been formed by one or a plurality of computers, the probability value is a ratio of a required cluster size of the formed cluster to a total number of computers in the formed cluster;
  a cluster forming step for forming a cluster including the computer itself and another computer indicated as being under the clustering enabled state by the clustering enabled/disabled information on the first table, updating the clustering enabled/disabled information on every computer included in the formed cluster on the first table to information indicating a clustering disabled state, and storing the addition easiness information on the cluster on the second table; and
  a cluster growing step for, when a candidate computer that is a candidate for addition exists, determining whether the candidate computer is to be added to the cluster according to the addition easiness information recorded on the second table,
  wherein the probability value varies with the addition of the candidate computer to the cluster as a trigger.

20. An article comprising a non-transitory machine readable tangible medium having embodied thereon a computer program, the computer program being executable by a management computer to control one or a plurality of computers, each capable of being clustered with another computer, as a computer or computers which belong to the management computer, the computer program being executable by the management computer to perform:

a network connecting step for establishing connection to a computer network that the management computer is capable of freely joining and leaving together with another management computer having the same type of function;

a table managing step for enabling access to a first table for storing clustering enabled/disabled information indicating whether a state of each computer is a clustering enabled state and a second table for storing addition easiness information indicating a probability value in adding another computer to a cluster which has already been formed by one or a plurality of computers, the probability value is a ratio of a required cluster size of the formed cluster to a total number of computers in the formed cluster;

a cluster forming step for forming a cluster including the computer under its control and the computer controlled by another management computer indicated as being under the clustering enabled state by the clustering enabled/disabled information on the first table, updating the clustering enabled/disabled information on every computer included in the formed cluster to information indicating a clustering disabled state, and storing the addition easiness information on the cluster on the second table; and a cluster growing step for, when a candidate computer that is a candidate for addition exists, determining whether the candidate computer is to be added to the cluster according to the addition easiness information recorded on the second table, wherein the probability value varies with the addition of the candidate computer to the cluster as a trigger.

* * * * *